(12) United States Patent
Rofougaran et al.

(10) Patent No.: US 12,732,301 B1
(45) Date of Patent: Sep. 8, 2026

(54) WIRELESS COMMUNICATION DEVICE AND METHOD FOR REAL-TIME OR NEAR REAL-TIME JAMMING SIGNALS MITIGATION

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/536,302

(22) Filed: Feb. 11, 2026

Related U.S. Application Data

(63) Continuation of application No. 19/332,084, filed on Sep. 18, 2025, now Pat. No. 12,598,020.

(51) Int. Cl.

| | |
|---|---|
| ***H04B 1/00*** | (2006.01) |
| ***G01S 7/02*** | (2006.01) |
| ***G01S 7/16*** | (2006.01) |
| ***H04B 7/08*** | (2006.01) |
| ***H04K 3/00*** | (2006.01) |

(52) U.S. Cl.
CPC ........... *H04K 3/224* (2013.01); *H04B 1/0007* (2013.01); *H04B 1/0096* (2013.01); *H04K 3/25* (2013.01)

(58) Field of Classification Search
None
See application file for complete search history.

(56) References Cited

U.S. PATENT DOCUMENTS

| | | | |
|---|---|---|---|
| 10,211,863 | B1 | 2/2019 | Grens |
| 10,243,761 | B1 | 3/2019 | Stockmaster et al. |

(Continued)

OTHER PUBLICATIONS

Notice of Allowance for U.S. Appl. No. 19/332,084 dated Dec. 16, 2025.

*Primary Examiner* — Pablo N Tran
(74) *Attorney, Agent, or Firm* — CHIP LAW GROUP

(57) ABSTRACT

A wireless communication device includes a multiple-input-multiple-output (MIMO) antenna array having a plurality of dual-polarized antennas configured to receive radio frequency (RF) signals in vertical and horizontal polarizations across a plurality of frequency bands. The device further includes a radio frequency (RF) frontend coupled to the MIMO antenna array. The RF frontend applies band-specific filtering to isolate signals-of-interest and down-converts and digitizes the signals-of-interest to predefined intermediate frequencies to obtain digitized down-converted signals. The device further includes a processor configured to determine signal characteristics of the digitized down-converted signals across a first intermediate frequency band and a second intermediate frequency band based on spatial analysis. The signal characteristics comprise temporal signal properties, spatial properties from MIMO antenna inputs, and polarization properties corresponding to vertical and horizontal components.

20 Claims, 8 Drawing Sheets

(56) References Cited

U.S. PATENT DOCUMENTS

| | | | | |
|---|---|---|---|---|
| 10,263,727 | B2 | 4/2019 | Hudson | |
| 11,125,888 | B2 | 9/2021 | Agee | |
| 11,366,232 | B2 | 6/2022 | Ryba | |
| 11,796,683 | B2 | 10/2023 | Kaplan | |
| 11,828,869 | B2 | 11/2023 | Dafesh | |
| 12,135,378 | B2 | 11/2024 | Poberezhskiy et al. | |
| 2017/0047954 | A1* | 2/2017 | Tian | H04B 1/0475 |
| 2020/0166652 | A1* | 5/2020 | Agee | H04B 1/0071 |
| 2023/0268963 | A1* | 8/2023 | Moon | H04B 7/0469 375/262 |
| 2025/0337464 | A1* | 10/2025 | Zeinolabedinzadeh | H04B 1/0007 |
| 2025/0392261 | A1* | 12/2025 | Perreault | H03F 1/0227 |

* cited by examiner

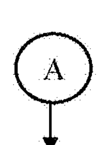

410

Determine phase coherence between signals detected in the first intermediate frequency band and the second intermediate frequency band
410C

Track phase relationships over time to identify frequency-hopping patterns
410D

Identify related signal sources or jamming patterns based on the determined phase coherence and the tracked phase relationships over time
410E

Detect a jamming signal and a jammer type in the digitized down-converted signals across the first intermediate frequency band and the second intermediate frequency band based on the cross-band correlation and the determined signal characteristics of the digitized down-converted signal
412

Determine a plurality of null steering parameters based on a combination of spatial characteristics of the jamming signal, a signal-to-interference ratio of the digitized down-converted signals, and a current state of a network performance for application of spatial nulling to the MIMO antenna array
414

Apply spatial nulling to multiple-input-multiple-output (MIMO) antenna array of the wireless communication device to dynamically suppress the jamming signal without affecting signals-of-interest in the digitized down-converted signals when the jammer type is a spatial jammer
416

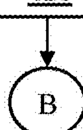

FIG. 4B

WIRELESS COMMUNICATION DEVICE AND METHOD FOR REAL-TIME OR NEAR REAL-TIME JAMMING SIGNALS MITIGATION

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/332,084, filed on Sep. 18, 2025. The above referenced application is hereby incorporated herein by reference in its entirety.

FIELD OF TECHNOLOGY

Certain embodiments of the disclosure relate to wireless communication devices and jamming signals mitigation systems. More specifically, certain embodiments of the disclosure relate to a wireless communication device and a method for real-time or near real-time jamming signals mitigation.

BACKGROUND

The rapid growth of wireless communication technologies and the increasing demand for high-bandwidth applications have led to significant challenges in the current spectrum management landscape. It is known that radio monitoring is the basis of spectrum management. Spectrum monitoring helps spectrum regulators to plan and use frequencies, avoid incompatible usage, and identify sources of harmful interference. It is a growing problem due to the growing number of spectrum uses. Equipment such as spectrum analyzers are useful tools for analyzing and monitoring radio frequency (RF) signals. These instruments are useful for wireless communications testing, ensuring regulatory compliance, and troubleshooting RF interference. Spectrum analyzers play vital roles in RF design, testing, and electronic circuit development. Conventional spectrum analyzers, while effective to a certain extent, face several limitations. Currently, there are many technical challenges in effective spectrum monitoring and signal analysis across multiple frequency bands in increasingly congested electromagnetic environments. For example, high-end analyzers capable of monitoring frequencies up to 80+ GHz can cost between $1-2 million per unit, with even lower frequency models (4-5 GHz) ranging from $15,000-50,000. This significant cost barrier prevents the widespread deployment of spectrum monitoring systems, particularly in applications requiring multiple monitoring points.

Current spectrum analysis solutions generally fall into two categories: swept and real-time analyzers. Swept analyzers operate by sequentially scanning frequency ranges, introducing deadtime between sweeps that can miss intermittent signals. Real-time analyzers offer faster acquisition but require complex and expensive hardware for concurrent Fast Fourier Transform (FFT) processing. Both approaches typically demand dedicated hardware for different frequency bands, further increasing system complexity and cost. These limitations become particularly problematic in modern wireless environments characterized by, for example: (a) increasing spectrum congestion from proliferating wireless devices; (b) growing deployment of autonomous systems requiring reliable communication; (c) need for reliable interference detection and mitigation; (d) requirements for spatial awareness and signal source location; and (e) complex signal environments requiring advanced pattern recognition. With conventional systems, while traditional software-defined radio (SDR) solutions offer more flexibility, they often have restricted frequency spans and insufficient processing capability for advanced signal analysis. Additionally, conventional analyzers struggle with limited spatial awareness, making it difficult to locate and characterize signal sources in complex environments. In another example, there is the form factor constraint with traditional systems used for spectrum monitoring. Traditional benchtop units require significant space whole portable units sacrifice functionality for mobility. Furthermore, USB-controlled systems depend on external computing resources.

Furthermore, existing approaches to mitigate interference often rely on static or slow-adapting methods, which may not effectively counteract rapidly evolving jamming tactics. The conventional systems and methods to mitigate interference are inadequate to handle the increasing complexity of wireless communication systems, especially in a congested radio frequency environment.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method for a real-time or near real-time jamming signals mitigation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 4A, 4B, 4C and 4D collectively, is a flowchart of a method for real-time or near real-time jamming signals mitigation, in accordance with an embodiment of the disclosure.

DETAILED DESCRIPTION OF THE DISCLOSURE

Figure 1:
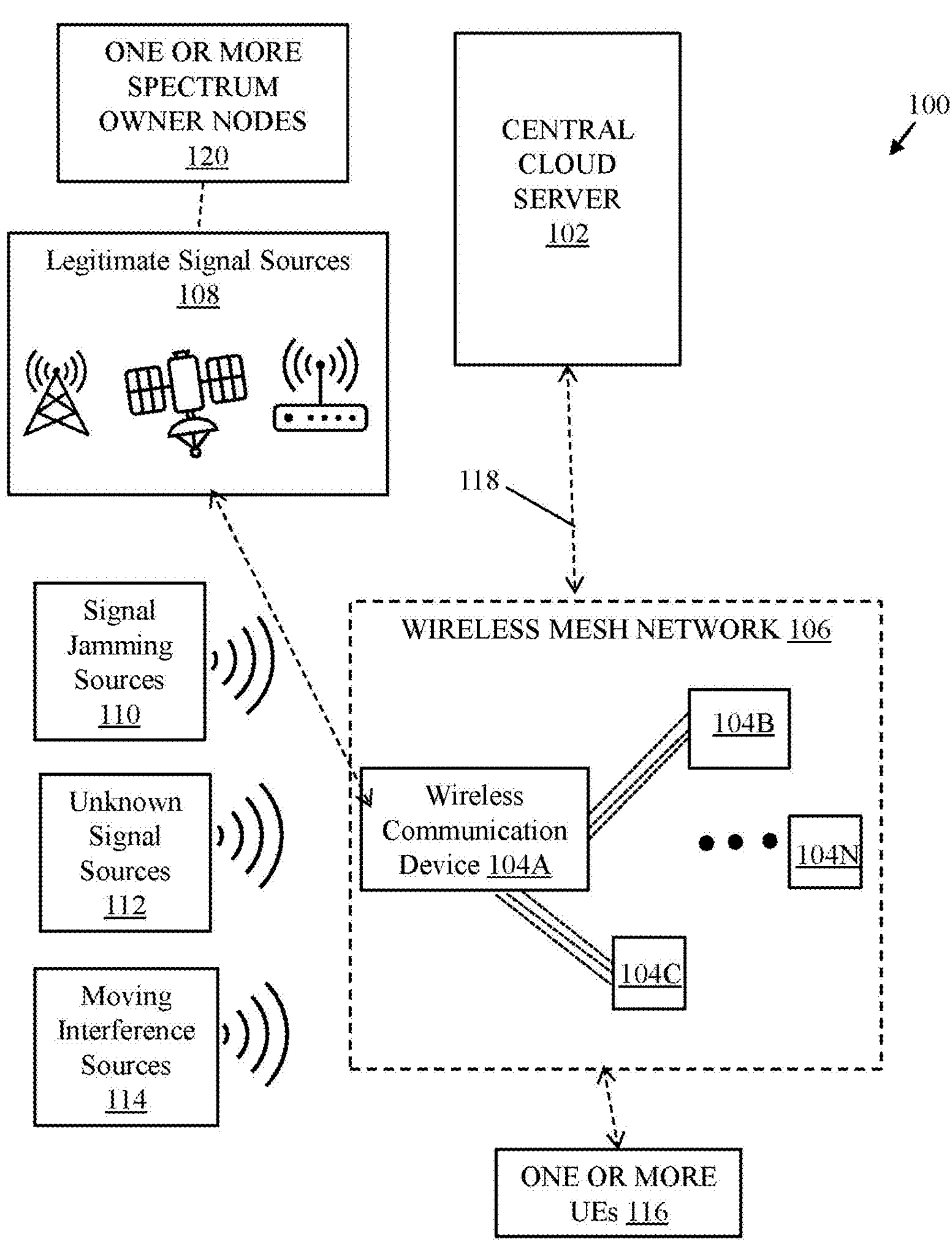
FIG. 1 is a diagram that illustrates an exemplary system for real-time or near real-time jamming signals mitigation, in accordance with an exemplary embodiment of the disclosure.

Certain embodiments of the disclosure may be found in a wireless communication device and a method for real-time or near real-time jamming signals mitigation.

Conventional systems manifest hardware complexity, such as multiple dedicated radio frequency (RF) front ends for different frequency bands, expensive analog-to-digital converters (ADCs) for high-bandwidth signal capture (e.g., >7 GHZ), and complex signal processing hardware driving high spectrum analyzer costs. Additionally, conventional devices struggle with limited spatial awareness, making it difficult to locate and characterize signal sources in complex environments.

In contrast to conventional systems and devices, the disclosed wireless communication device and method achieves real-time or near real-time jamming signal mitigation through intelligent integration of MIMO, MLO, and enhanced signal processing operations. For example, traditional jammer mitigation approaches typically rely on single-band detection and predetermined countermeasures, limiting their effectiveness against sophisticated jamming threats. The disclosed wireless communication device and method overcomes these limitations through intelligent and synergistic integration of spatial nulling, MLO-based resistance, and cognitive learning operations.

The multi-band processing capability of the wireless communication device, for example, concurrent handling of 5 GHz and 6 GHz bands, may enable improved and immediate (almost near real-time) cross-validation of potential jamming signals (a capability that may be absent in existing solutions). The multi-band approach, combined with spatial analysis and cross-band correlation may significantly reduce false positives while maintaining effective system responsiveness, as compared to conventional systems. Further, the wireless communication device may detect jammer type from processing digitized down-converted signals across intermediate frequency bands (e.g. 5 GHz and 6 GHz) based on the cross-band correlation and determined signal characteristics of the digitized down-converted signals. The ability of the wireless communication device to validate the mitigation success of jamming signals through a cross-band validation represents a significant advancement over existing solutions that lack confirmation mechanisms, ensuring sustained communication reliability in radio frequency (RF) environments.

Furthermore, in contrast to conventional systems and devices (e.g. conventional spectrum analyzers) requiring dedicated hardware for different frequency bands, embodiments herein advantageously utilize commercial WLAN chipsets (e.g., IEEE 802.11be chipset and modems) with intelligent signal down conversion and signal processing architectures to achieve wide frequency range coverage (DC to 300 GHz) in a cost-effective manner. The disclosed MIMO-MLO integration enables capabilities previously requiring multiple expensive dedicated instruments. For example, the received RF signals captured from air of 0-100+ GHz may be down converted and digitized to desired intermediate frequencies, for example, frequencies like (5 GHz and 6 GHZ) capable of being processed firstly in the WLAN chipset, which not only simplifies the signal processing but also reduces the cost effectively without any compromise in spectrum analysis results. For example, there is no need for expensive ADCs to handle high-bandwidth signal capture (e.g., >7 GHZ) directly, and complex signal processing hardware due to down conversion to desired intermediate frequencies. The disclosed wireless communication device may be configured to concurrently process digitized down-converted signals in a first intermediate frequency band (e.g. 5 GHZ) and a second intermediate frequency band (6 GHZ) corresponding to the predefined intermediate frequencies, based on configuration of multi-link operation (MLO) parameters in the wireless communication device. Such a cross-band correlation between different intermediate frequency bands, enabled by MLO parameters, allows detection of related signal patterns across frequency bands-a capability absent in traditional single-band analyzers. This cross-correlation technique provides improved interference rejection and signal characterization.

FIG. 1 is a diagram that illustrates an exemplary network environment of a system for real-time or near real-time jamming signals mitigation, in accordance with an exemplary embodiment of the disclosure. With reference to FIG. 1, there is shown a system 100 for enhanced spectrum sensing across multiple frequency bands. The system 100 may include a central cloud server 102, a plurality of wireless communication devices, such as wireless communication devices 104A, 104B, 104C, . . . , 104N. In an implementation, the wireless communication devices 104A, 104B, 104C, . . . , 104N may be interconnected with each other in a wireless mesh network 106. In another implementation, each of the wireless communication devices 104A, 104B, 104C, . . . , 104N may function independently as a standalone device for enhanced spectrum sensing across multiple frequency bands or may work in cooperation with each other for not only enhanced spectrum sensing across multiple frequency bands but also wireless data communication and routing across the wireless mesh network 106.

There are further shown different types of signal sources, such as legitimate signal sources 108, signal jamming sources 110, unknown signal sources 112, and moving interference sources 114. The legitimate signal sources 108, for example, may be authorized and licensed wireless carrier network frequencies, for example, 4G or 5G signals from base stations or small cells, frequencies used for direct-to-cell service (e.g., satellite-to-cell phone service), or authorized wireless local area network (WLAN) signals (e.g., Wi-Fi® signals), or other legitimate commercial or non-commercial RF signals, as per use case. The legitimate signal sources 108 may be associated with one or more spectrum owner nodes 120. The wireless communication devices 104A, 104B, 104C, . . . , 104N may not be initially aware of the different types of signal sources and may perform RF signal (airwaves) scanning to detect and identify active signal sources and potential receivers operating on specific frequencies within range. In an implementation, the wireless communication devices 104A, 104B, 104C, . . . , 104N may be further communicatively coupled to the central cloud server 102, via a communication network 118.

The central cloud server 102 includes suitable logic, circuitry, and interfaces that may be configured to communicate with the wireless communication devices 104A, 104B, 104C, . . . , 104N (may also be referred to as network nodes or a mesh nodes). In an implementation, the central cloud server 102 may be communicatively coupled to each network node including the one or more user equipment (UEs) 116. In an example, the central cloud server 102 may be a remote management server that is managed by a third party different from the service providers associated with the plurality of different wireless carrier networks (WCNs), service providers or spectrum owners. In another example, the central cloud server 102 may be a remote management server or a data center that is managed by a third party, or jointly managed, or managed in coordination and association with one or more of the plurality of different WCNs or different service providers.

The wireless communication devices 104A, 104B, 104C, . . . , 104N may also be referred to as mesh nodes when connected to each other in the wireless mesh network

106. Each of the wireless communication devices 104A, 104B, 104C, . . . , 104N, may be configured to capture and monitor raw RF signals from direct current (DC, i.e. 0 hertz (Hz)) to 300 Gigahertz (GHz) and analyze the captured RF signals. Each of the wireless communication devices 104A, 104B, 104C, . . . , 104N may be a multi-functional device for spectrum-sensing across a plurality of frequency bands (DC to 300 GHz) as well as wireless data communication to one or more other wireless communication devices in the wireless mesh network 106. Examples of the wireless communication devices 104A, 104B, 104C, . . . , 104N, may include but is not limited to a wide-range spectrum monitoring device or a special dual-purpose device for spectrum sensing and wireless data communication, a modified repeater device, or a 5G backplane system.

The wireless mesh network 106 may be a resilient, high-capacity wireless network that extends the reach of a fiber backbone to provide widespread coverage to end users, such as the one or more UEs 116 via the wireless communication devices 104A, 104B, 104C, . . . , 104N. The fiber backbone (not shown) may be a high-performance, fiber-optic core network infrastructure that connects central offices, data centers, and the wireless mesh network 106. The fiber backbone may aggregate traffic from the central offices and data centers and provide seamless integration between the fiber and wireless network components.

The legitimate signal sources 108 may refer to authorized transmitters operating within licensed frequency bands in compliance with regulatory standards and predetermined protocols. Examples of the legitimate signal sources may include, but not limited to, cellular base stations, small cells, or repeaters, Licensed FM/AM radio stations, commercial broadcast transmitters, public safety communications, satellite downlinks, authorized military communications within designated bands (if that is required in a use case), authorized Wi-Fi® signals, GPS satellites operating at 1575.42 MHz, and licensed point-to-point microwave links (e.g., cellular backhaul links operating at 6/11/18/23 GHz or other bands, financial trading networks using 70/80 GHz E-band, Broadcast studio-to-transmitter links (STL), for example, at 950 MHz, utility Supervisory Control and Data Acquisition (SCADA) networks operating at 4/6 GHz, enterprise building-to-building connections at 60 GHz, or public safety backhaul networks at 4.9 GHz, or Internet service provider backbone links).

The signal jamming sources 110 may refer to devices deliberately emitting interference signals designed to disrupt or degrade wireless communications across single or multiple frequency bands. Examples of the signal jamming sources may include, but not limited to, GPS jammers, cellular blockers (e.g., multi-band jammers (GSM/CDMA/3G/4G/5G), Frequency hopping cell disruptors, Band-specific blockers (700 MHz/850 MHz/1900 MHz), Smart jammers targeting control channels, or Base station signal overriders), broadband noise generators, targeted frequency disruptors, and pulsed interference systems.

The unknown signal sources 112 may refer to transmitters producing RF emissions that do not conform to known signal characteristics, protocols, or authorized frequency allocations. Examples of the unknown signal sources may include, but not limited to, unidentified transmitters, non-standard modulation signals, encrypted transmissions of unknown origin, sporadic unauthorized emissions, and signals using uncharacterized protocols.

The moving interference sources 114 may refer to mobile entities generating RF interference that change spatial location over time, whether intentional or unintentional. Examples of the moving interference sources 114 may include, but not limited to, vehicles with malfunctioning electronics, mobile jamming platforms, interference-generating drones, vessels with non-compliant radio systems, and portable unauthorized transmitters in motion.

The one or more UEs 116 may correspond to a wireless device, such as a client device or a telecommunication hardware used by an end-user to communicate. Some of the one or more UEs 116 may refer to a combination of a mobile equipment and subscriber identity module (SIM). Examples of the one or more UEs 116 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The communication network 118 may refer to the infrastructure and protocols enabling secure data exchange between the wireless communication devices 104A, 104B, 104C, . . . , 104N and the central cloud server 102 through one or more known wireless transmission mediums.

The one or more spectrum owner nodes 120 may be configured to communicate with the central cloud server 102. The central cloud server 102 may obtain frequency spectrum availability metadata and custom-defined access parameters from the one or more spectrum owner nodes 120. The system 100 may allow spectrum owners to define customized access rules and data routing logic, via the one or more spectrum owner nodes 120. The spectrum owners may specify smart contract rules encoding authorization credentials like crypto keys for allowing client devices, such as the one or more UEs 116, to dynamically subscribe to and use owned bands or underutilized spectrum.

The various operations of the disclosed system 100 may be explained by taking an example of one wireless communication device, such as the wireless communication devices 104A. It is to be understood that operations described for the wireless communication device 104A may be applicable to other wireless communication devices 104B, 104C, . . . , 104N. For example, each of the wireless communication devices 104A, 104B, 104C, . . . , 104N may be configured to perform wideband spectrum monitoring with high sensitivity and dynamic range while intelligently utilizing the processing capabilities of a commercial WLAN chipset (e.g., IEEE 802.11be chipset and modems) modified for signal monitoring with intelligent signal down conversion and signal processing architectures to achieve wide frequency range coverage (DC to 300 GHz) in a cost-effective manner.

Typically, IEEE 802.11be/ax (Wi-Fi® 7/6E) hardware is conventionally designed for high-throughput wireless networking, operating in 2.4 GHz, 5 GHZ, and 6 GHz bands. It provides features like multi-link operation (MLO), 320 MHz channels, 4K Quadrature Amplitude Modulation (QAM) modulation, and multi-user Multiple-Input Multiple-Output (MIMO) primarily for data communication between access points and client devices.

The present disclosure intelligently modifies and repurposes IEEE 802.11be/ax hardware beyond its standard networking role by integrating wideband spectrum monitoring capabilities. In an example, the wireless communication device 104A may leverage the hardware's advanced signal processing capabilities while extending frequency coverage from DC to 300 GHz through multi-stage conversion (otherwise primary coverage is only frequency range of 1-7 GHz and that too not for spectrum monitoring purpose). This adaptation enables concurrent operation as a wireless networking device and a spectrum monitoring platform, utilizing features like MLO and high-speed signal processing for signal detection, classification, and analysis across a significantly broader range than traditional Wi-Fi® operations. The wireless communication device 104A maintains networking functionality in the system 100 while adding capabilities for detecting different types of signal sources, such as legitimate signal sources 108, signal jamming sources 110, unknown signal sources 112, and moving interference sources 114.

In an implementation, multiple monitoring nodes, such as the wireless communication devices 104B, 104C, . . . , 104N, may operate concurrently across different frequency bands. In such a case, each node may perform local analysis, and the data is then sent to a central fusion center, such as the central cloud server 102, for real-time processing and combining. This distributed approach may further allow for enhanced spatial coverage, improved jammer resistance through diversity, and scalable deployment while maintaining high-resolution analysis capabilities.

Beneficially, each of the wireless communication devices 104A, 104B, 104C, . . . , 104N intelligently modifies and repurposes IEEE 802.11be/ax hardware beyond its standard networking role by combining spatial analysis with cross-band correlation across two or more intermediate frequency bands (e.g. 5 GHz and 6 GHz), enabling more accurate and reliable jammer detection. In an example, the wireless communication device 104A may detect jammer type from digitized down-converted signals across the two or more intermediate frequency bands (e.g. 5 GHz and 6 GHz) based on the cross-band correlation and determined signal characteristics of the digitized down-converted signals. This enables the wireless communication device 104A to perform a right mitigation based on jammer type. For example, when the jammer type is a spatial jammer, an enhanced and effective spatial nulling may be applied. Further, when the jammer type is non-spatial jammer, a jammer defense function maybe activated at a corresponding wireless communication device to switch communication to an unaffected intermediate frequency band for non-spatial jammers. Furthermore, the wireless communication device 104A may validate the mitigation success of jamming signals through a cross-band validation which represents a significant advancement over existing solutions that lack confirmation mechanisms, ensuring sustained communication reliability in RF environments.

Figure 2:
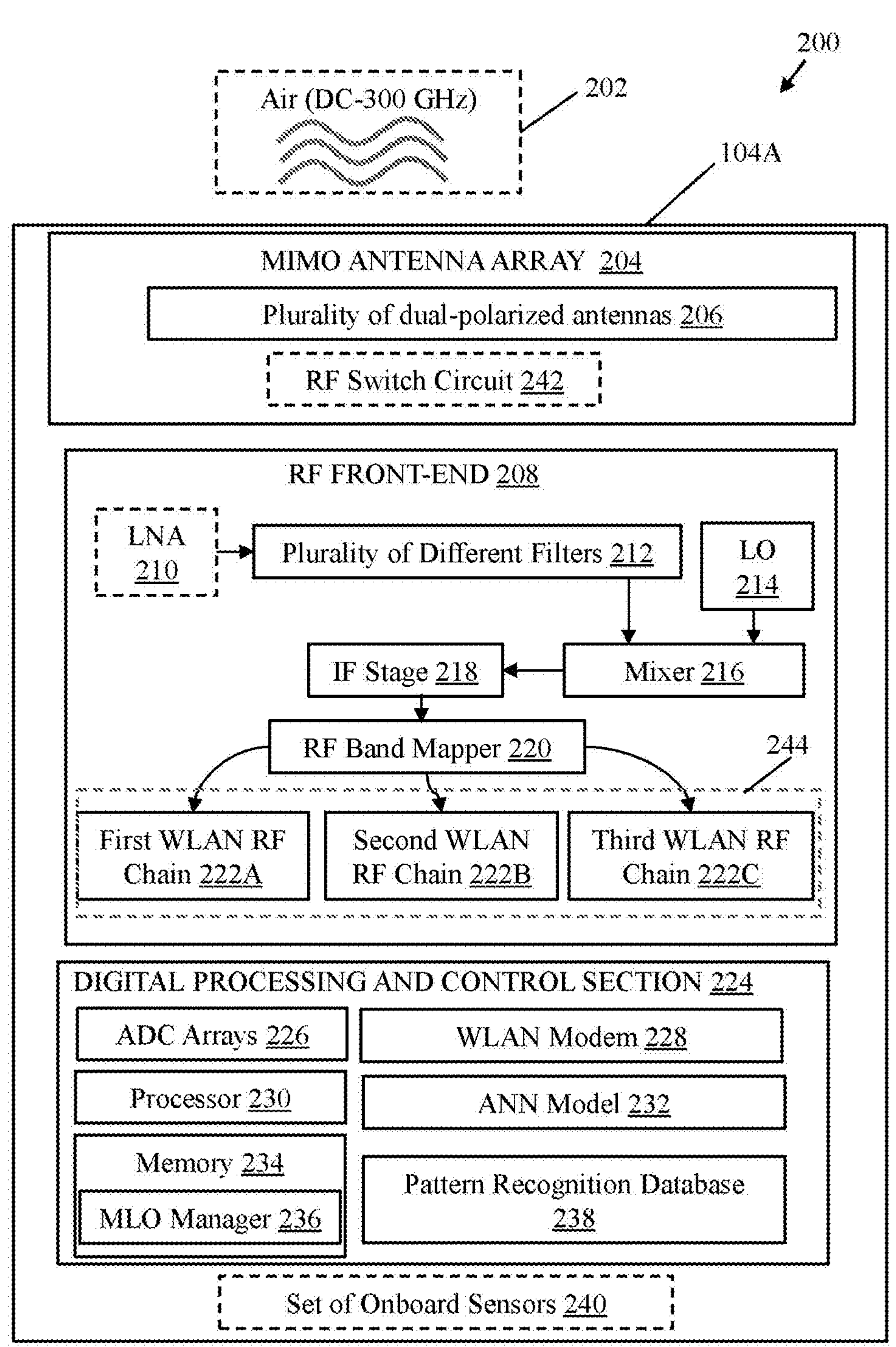
FIG. 2 is a block diagram that illustrates various components of an exemplary wireless communication device for real-time or near real-time jamming signals mitigation, in accordance with an exemplary embodiment of the disclosure.

FIG. 2 is a block diagram that illustrates various components of an exemplary wireless communication device for enhanced spectrum sensing across multiple frequency bands, in accordance with an exemplary embodiment of the disclosure. FIG. 2 is explained in conjunction with elements from FIG. 1. With reference to FIG. 2, there is shown a block diagram 200 of the wireless communication devices 104A.

The wireless communication devices 104A may include an antenna array system, such as a multiple-input-multiple-output (MIMO) antenna array 204. The MIMO antenna array 204 may include a plurality of dual-polarized antennas 206. In an implementation, the antenna array system, such as the MIMO antenna array 204 may include a radio frequency (RF) switch circuit 242. The wireless communication devices 104A may include an RF front-end 208 and a digital processing and control section 224.

The RF front-end 208 may include a low-noise amplifier (LNA) 210, a plurality of different filters 212, a local oscillator 214, a mixer 216, an intermediate frequency (IF) stage 218, an RF band mapper 220, a WLAN radio (e.g., an IEEE 802.11be radio) comprising distinct RF chains for concurrent operations across different frequency bands, such as a first WLAN radio chain 222A (e.g., RF chain 1 for 2.4 GHz band processing), a second WLAN radio chain 222B (e.g., RF chain 2 for 5 GHz band processing), and a third WLAN radio chain 222C (e.g., RF chain 3 for 6 GHz band processing). Each chain may comprise dedicated components (LNA, mixers, filters) optimized for its specific frequency band, enabling concurrent multi-band operation (not shown for the sake of brevity).

The digital processing and control section 224 may be configured to handle digital processing (e.g., analog to digital conversions, digital signal processing, multi-link operations (MLO) processing, baseband processing etc.,), WLAN modem functions, as well as system control functions (e.g., a system on a chip (Soc)). The digital processing and control section 224 may include ADC arrays 226, a WLAN modem 228, a processor 230, an artificial neural network (ANN) model 232, a memory 234 with an MLO manager 236, and a pattern recognition database 238. In an implementation, the wireless communication devices 104A may further include a set of onboard sensors 240.

The MIMO Antenna Array 204 may include the plurality of dual-polarized antennas 206 configured to receive radio frequency signals in vertical and horizontal polarizations across the plurality of frequency bands, for example, ranging from direct current (DC) to 300 GHz. The MIMO Antenna Array 204 may incorporate dedicated MIMO elements for 2.4/5/6 GHz Wi-Fi® bands and wideband elements for full spectrum coverage enabling comprehensive spectrum sensing capabilities across multiple frequency bands (i.e., not only supports primary coverage from 1-7 GHz but manifest extended range capability to DC-300 GHz through multi-stage conversion techniques).

The RF front-end 208 may be configured to apply band-specific filtering operation to the received radio frequency signals to isolate signals-of-interest with at least 50-80 decibels of spurious signal suppression. In an implementation, the RF front-end 208 may maintain a noise figure below 3 decibels and phase noise performance of −110 dBc/Hz at 10 kHz offset with dynamic range exceeding 90 decibels. The RF front-end 208 may comprise low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHz, 5 GHZ, or 6 GHz). The RF band mapper 220 may enable concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may refer to a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis, signal classification, and cross-band correlation across multiple intermediate frequency bands (e.g., 5 GHz and 6 GHz). The processor 230 may be part of Soc and may incorporate one or more processing units including Central Processing Unit (CPU), Neural Processing Unit (NPU), and Digital Signal Processor (DSP) for specialized signal processing tasks.

The memory 234 may refer to a storage configured to store processing data and signal patterns. The memory 234 may provide hierarchical memory architecture for efficient data access and processing. Examples of implementation of the memory 234 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The MLO manager 236 may refer to a multi-link operation manager configured to control concurrent processing across multiple frequency bands and manage system interfaces for coordinated operation.

The pattern recognition database 238 may refer to a database system configured to maintain historical signal correlation patterns and update correlation thresholds based on pattern recognition results, enabling adaptive learning and pattern evolution tracking.

The set of onboard sensors 240 refers to environmental and operational sensors configured to provide supplementary data to support signal classification and threat assessment capabilities, where the sensors enable enhanced contextual awareness for signal processing decisions. For example, the set of onboard sensors 240 may include one or more image sensors, a lidar sensor, a Radar, a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, the one or more image sensors may be used to visually monitor the surroundings of each network node. The lidar sensor may be referred to as light detection and ranging sensors used to enable accurate three-dimensional (3D) profiling and depth perception of surroundings of each network node for precise beam alignment. The Radar may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In this case, such raw IMU output may be processed to measure node vibrations, shocks, and orientation changes at each network node.

The RF switch circuit 242 may refer to a radio frequency switch circuit configured to route signals between multiple antenna elements with switching time less than 100 microseconds and frequency step size of 100 kHz. The RF switch circuit 242 may enable rapid transitions between frequency bands for continuous spectrum monitoring. In an implementation, the RF switch circuit 242 may be configured to perform dynamic beam steering by switching between different phased antenna arrays installed at different positions around the wireless communication device 104A to route RF signals along different directions as required. This enables adaptable signal propagation, responding to changing network conditions and optimizing communication paths for improved reliability and performance.

In operation, the MIMO antenna array 204 that comprises the plurality of dual-polarized antennas 206 may be configured to receive radio frequency (RF) signals in vertical and horizontal polarizations across a plurality of frequency bands. In FIG. 2, the RF signals in the air captured by the MIMO antenna array 204 may be represented by wavy lines (i.e., the airwave 202). In an example, the MIMO antenna array 204 may be a 4×4 MIMO array. In an implementation, the MIMO antenna array 204 may be an antenna array system that may include one or more wide array antennas and may provide 360° coverage pattern. In an implementation, the MIMO antenna array 204 may include four independent antenna elements with different phases (0°, 90°, 180°, 270°). The MIMO antenna array 204 may be configured to receive multiple independent data streams concurrently on different antennas, effectively increasing capacity without requiring more bandwidth and when receiving the same signal from different antennas may provide diversity gain to combat fading and improve signal reliability. Further, the plurality of dual-polarized antennas 206 are configured to enhance signal reception and improve spectral efficiency by capturing RF signals in both vertical and horizontal polarizations across multiple frequency bands. For example, each antenna element within the MIMO antenna array 204 may be equipped with orthogonally oriented dipoles or patch radiators that are capable of concurrently receiving RF signals in both vertical and horizontal polarization planes. In this case, since each antenna element may support two independent polarization modes (vertical and horizontal), the combination of MIMO with dual polarization effectively doubles the data communication capacity without increasing bandwidth or frequency usage. Further, as the plurality of dual-polarized antennas 206 allow two independent communication channels per antenna, the need for additional physical antennas is reduced, which may be useful for space-limited applications for compact antenna design and contribute to portability of the wireless communication device 104A. The combination of MIMO feature with the dual-polarized antennas allows the wireless communication device 104A to capture signals from multiple spatial points and enhances detection accuracy with full polarization coverage for all types of transmissions. This helps detect hidden, weak, or non-line-of-sight (NLOS) signals, useful in crowded RF environments.

In accordance with an embodiment, the plurality of frequency bands captured by the MIMO antenna array 204 may range from DC to 100 gigahertz (GHz). In other words, the wireless communication device 104A may perform a real-time, wide-band spectrum monitoring across frequencies ranging from DC to 100 GHz with high resolution (for example, down to about 19 kHz). In accordance with an embodiment, the plurality of frequency bands captured by the MIMO antenna array 204 may range from direct current (DC) to 300 gigahertz (GHz). The wireless communication device 104A may be a multi-functional device for mitigation of the jamming signal as well as wireless data communication to one or more other wireless communication devices 104B, 104C, . . . , 104N in the wireless mesh network 106. In other words, each network node functions as a spectrum analyzer, a jammer mitigation device and a high-speed communication endpoint.

In accordance with an embodiment, the RF front-end 208 coupled to the MIMO antenna array 204, may be configured to apply band-specific filtering operation to the received RF signals to isolate signals-of-interest. The RF frontend further may comprise the plurality of different filters 212 for the band-specific filtering operation of the received RF signals for the isolation of the signals-of-interest along with at least 50-80 decibels (dB) of spurious signal suppression. In an implementation, the LNA 210 may be placed before pre-filtering stage, as spectrum monitoring may often involve detecting weak or distant signals (e.g., covert transmissions, military radar, low-power IoT devices). Further, to sniff RF signals from the airwave 202, especially the broad frequency range (e.g., DC-100 GHz), the LNA 210 first approach ensures that signals across all frequencies are captured with minimal loss before band-specific filtering operation. The LNA 210 may amplify such weak signals before they encounter any filtering losses, improving detection accuracy. In some implementations, the LNA 210 may not be placed before the plurality of different filters 212 to reduce out-of-band interference. The wireless communication device 104A may opt for both options of LNA 210 first or without LNA 210 alternatively to see if there is any difference in spectrum monitoring results for enhanced analysis.

In an example, the plurality of different filters 212 may be pre-filters that may process signals across distinct frequency ranges, where low band filtering may operate from 50 MHz to 1 GHz to eliminate interference from TV, FM, and LTE signals, mid band filtering may operate from 1 GHz to 3 GHz to suppress cellular and adjacent Wi-Fi® bands, and high band filtering may operate from 3 GHz to 100 GHz and above to isolate high-frequency signals from 5G, radar, and millimeter-wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementation, the wireless communication device 104A may implement an adaptive digital filtering operation using DSP-based notch filters after the analog filtering stage, which may enhance the overall spurious signal rejection capabilities. Further, the implementation of narrowband bandpass filters may enable selective passing of signals-of-interest while maintaining substantial attenuation of unwanted RF signals, wherein the multi-stage spurious suppression techniques may achieve 50-80 dB of rejection. This comprehensive filtering approach may be particularly advantageous in dense RF environments where multiple interfering signals may be present, enabling the system to effectively isolate and monitor specific frequency bands of interest while maintaining high signal quality through robust interference suppression.

In accordance with an embodiment, the RF front-end 208 may be further configured to down-convert and digitize the isolated signals-of-interest to predefined intermediate frequencies to obtain digitized down-converted signals. In an implementation, the RF front-end 208 may employ the mixer 216 and the LO 214 configuration, where the mixer 216 may combine the filtered RF signals with the LO-generated stable frequency to produce sum and difference frequencies. The difference frequency (RF-LO frequency) may be selected as the desired intermediate frequency (IF), such as 5 GHZ, 6 GHZ, or 7 GHz while the sum frequency may be discarded. In this case, the IF selection may be predetermined ensuring compatibility with subsequent digitization hardware (e.g., the IEEE 802.11be chipset, such as the WLAN radio 244 and the WLAN modem 228). The down-conversion to predefined intermediate frequencies allows the wireless communication device 104A to leverage, for example, the IEEE 802.11be chipset's processing architectures, reducing hardware complexity, while re-purposing for enhanced spectrum monitoring as well as wireless data communication. The down-converted IF signals may then be processed through an Analog-to-Digital Converter (ADC) that may sample and convert the analog IF signals into digital form. Further, the selection of predefined intermediate frequencies may be specifically configured to avoid interference from other signals while matching ADC bandwidth and resolution requirements. This down-conversion and digitization approach may enable advanced digital signal processing capabilities, including real-time filtering, demodulation, and pattern recognition, which may be particularly beneficial for spectrum monitoring applications requiring signal classification, anomaly detection, and cognitive RF adaptation for interference mitigation.

In accordance with an embodiment, the radio frequency (RF) front-end 208 may be further configured to perform an RF mapping of the received RF signals in the plurality of frequency bands to one of the predefined intermediate frequencies corresponding to a first intermediate frequency band or a second intermediate frequency band. The first intermediate frequency band may be different from the second intermediate frequency band. Each of the predefined intermediate frequencies corresponding to the first intermediate frequency band and the second intermediate frequency band is one of: 2.4 GHZ, 5 GHZ, 6 GHZ, 7 GHZ, or other unlicensed or Industrial, scientific, and medical (ISM) frequency band. The RF band mapper 220 may be configured to demultiplex the obtain digitized down-converted signals in the predetermined intermediate frequencies (e.g., a common intermediate frequency or one or more predetermined intermediate frequencies) into different WLAN frequency bands (e.g., 2.4 GHz, 5 GHz, and 6 GHZ) and may assign dedicated paths for efficient processing. The frequency mapping may ensure that the signals are optimally allocated and processed based on resource availability. Based on the resource status, the best IF band assignment out of the different WLAN frequency bands may be done. Once the RF mapping is complete, the digitized down-converted signals signal may then be processed.

In an example, the RF mapping may incorporate channel and spatial mapping capabilities, wherein each frequency band may be divided into distinct channels, and spatial mapping may be performed to optimize beamforming and interference management. The wireless communication device 104A may implement a resource allocation mechanism that may dynamically check available resources and perform load balancing across the 2.4/5/6 GHz bands based on congestion levels. Further, the RF front-end 208 may assign dedicated processing paths to the different WLAN frequency bands, where the signals may undergo specific filtering, mixing, and digitization processes based on predefined IF mapping configurations. In other words, the RF front-end 208 may assign to the WLAN radio 244 (e.g., an IEEE 802.11be radio) comprising distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) optimized for its specific frequency band, enabling concurrent multi-band operation. This comprehensive RF mapping approach may enable efficient spectrum utilization and optimal signal processing, particularly beneficial for next operation of implementing Multi-Link Operation (MLO) that may require dynamic frequency assignment across multiple bands while maintaining minimal interference and maximum processing efficiency.

In accordance with an embodiment, the processor 230 may be configured to concurrently process the digitized down-converted signals in a first intermediate frequency band and a second intermediate frequency band corresponding to the predefined intermediate frequencies, based on configuration of multi-link operation (MLO) parameters in the wireless communication device 104A. The MLO parameters may include buffer sizes for each Intermediate Frequency (IF) band that determine temporary data storage capacity (e.g., configured as powers of 2, like 4096 or 8192 samples), Fast Fourier Transform (FFT) window parameters (including window size, overlap percentage, and window function type) that control frequency resolution and processing accuracy, sampling rates for each Analog-to-Digital Converter (ADC) of the ADC arrays 226 that determine data acquisition speeds (e.g., 160 MHz for 5 GHz band, 320 MHz for 6 GHz band), cross-correlation thresholds that define sensitivity for pattern detection between bands (typically ranging from 0.7 to 0.95 for correlation coefficients), and memory allocation settings for continuous FFT buffers that manage ongoing computations through circular buffer implementations and cache-aligned memory allocation. The MLO parameters configuration may operate in concert to enable efficient concurrent processing, maintain processing continuity, prevent data loss, optimize resource utilization, and ensure reliable cross-band correlation, with their specific values being tuned based on hardware capabilities, processing requirements, signal characteristics, and system performance targets. For example, the concurrent processing of digitized down-converted signals in 5 GHz and 6 GHz bands may be implemented by first configuring MLO parameters where the 5 GHz band may utilize a 4096-sample buffer with 160 MHz sampling rate and 1024-point FFT processing, while the 6 GHz band employs a larger 8192-sample buffer with 320 MHz sampling rate and 2048-point FFT to accommodate its higher bandwidth requirements. The processor 230 may maintain two concurrent processing paths, where the first path (e.g., the second WLAN radio chain 222B) may handles the 5 GHz IF signals with a correlation threshold of 0.85 and 75% FFT window overlap for enhanced temporal resolution in potentially noisier environments, while the second path (e.g., the third WLAN radio chain 222C) may processes 6 GHz IF signals with a stricter 0.90 correlation threshold and similar 75% overlap for cleaner band operation.

In accordance with an embodiment, for the concurrent processing of the digitized down-converted signals for the spectrum monitoring, the processor 230 may be further configured to execute a sliding window Fast Fourier Transform (FFT) operation on the digitized down-converted signals from each of the first intermediate frequency band and the second intermediate frequency band. The processor 230 may be further configured to maintain a continuous FFT buffer for each of the first intermediate frequency band and the second intermediate frequency band. The processor 230 may be further configured to compute cross-correlation coefficients between FFT outputs of the first intermediate frequency band and the second intermediate frequency band to detect temporal signal patterns. In other words, for spectrum monitoring, the processor 230 may continuously execute sliding window FFT operations on both bands concurrently, maintaining separate circular FFT buffers (4 memory blocks for 5 GHz, 8 for 6 GHz) to store historical FFT outputs, and compute cross-correlation coefficients between the bands with a minimum confidence threshold of 0.90 to detect temporal signal patterns and potential interference. The cross-correlation coefficients may measure the similarity between signals in two different frequency bands (in this case, 5 GHz and 6 GHZ) at different time shifts. The coefficient may range from −1 to 1, where "1" may indicate a perfect correlation (signals are very similar), "0" may indicate no correlation (signals are unrelated); and "−1" may indicate perfect negative correlation (signals are inversely related). The correlation coefficient calculation may normalize both signals, compute their dot product, and compare against the threshold (0.90). This MLO-based concurrent processing enables real-time spectrum analysis across both bands while optimizing resource utilization through band-specific parameter tuning, achieving enhanced spectrum monitoring capabilities through concurrent pattern detection and cross-band correlation analysis.

In accordance with an embodiment, the processor 230 may be further configured to determine signal characteristics of the digitized down-converted signals across the first intermediate frequency band and the second intermediate frequency band based on spatial analysis on the digitized down-converted signals. In an example, the signal characteristics of digitized down-converted signals may include temporal signal properties (e.g., signal amplitude, phase variations, and power levels), spatial properties from MIMO antenna inputs (e.g., phase differences between antenna elements, spatial correlation, and direction of arrival information), band-specific characteristics (e.g., signal strength and phase relationships in each intermediate frequency band), or polarization properties (e.g., vertical and horizontal signal components). Such signal characteristics may be analyzed not just for one band but concurrently across the first intermediate frequency band and the second intermediate frequency band for jammer detection and mitigation based on the concurrent processing of the digitized down-converted signals. Alternatively stated, the determination of the signal characteristics of the digitized down-converted signals may include concurrently analyzing the digitized down-converted signals from multiple intermediate frequency bands (e.g., 5 GHz and 6 GHz).

In accordance with an embodiment, the processor 230 may be configured to determine signal characteristics across multiple intermediate frequency bands through concurrent spatial analysis of the digitized down-converted signals from both the first intermediate frequency band (e.g., 5 GHZ) and the second intermediate frequency band (e.g., 6 GHz). The processor 230 may be configured to process signals from each MIMO antenna element of the MIMO antenna array 204 to compute phase differences between array elements, construct spatial correlation matrices, and map signal variations across the physical antenna array space separately for each band. For each intermediate frequency band, the processor 230 may extract temporal properties by analyzing signal amplitude, phase variations, and power levels, while concurrently deriving spatial properties by measuring phase relationships between antenna elements, calculating spatial correlation patterns, and determining direction of arrival through phase comparisons. The dual-polarized antenna inputs may enable decomposition of signals into vertical and horizontal components for polarization-based analysis in each band.

In accordance with an embodiment, the concurrent processing across both intermediate frequency bands may allow the wireless communication device 104A to generate a comprehensive spatial-frequency profile by combining the band-specific characteristics. The processor 230 may be configured to generate spatial signatures for each intermediate frequency band by integrating the temporal-spatial features, polarization components, and array manifold measurements. This multi-band spatial analysis may provide a rich set of signal characteristics that captures both frequency-dependent and spatial behaviors of the received signals, enabling more robust detection and classification of potential jammers. The processor 230 may maintain concurrent processing streams for both bands while preserving the phase and amplitude relationships necessary for accurate spatial analysis, resulting in a unified signal characteristics profile that spans both frequency domains. In an example, the processor 230 may employ algorithms such as Multiple Signal Classification (MUSIC) or Estimation of Signal Parameters via Rotational Invariance Techniques (ESPRIT) to extract the spatial characteristics including direction of arrival of the digitized down-converted signals, spatial correlation between signal paths, or spatial distribution patterns of signal sources.

In accordance with an embodiment, the processor 230 may be further configured to perform a cross-band correlation between the processed digitized down-converted signals from the first intermediate frequency band and the second intermediate frequency band to identify related signal patterns. By taking the example of the cross-band correlation between 5 GHz and 6 GHz intermediate frequency bands, the related signal pattern may be identified by analyzing the temporal and spectral relationships between the processed digitized down-converted signals from both bands. The processor 230 may normalize the FFT outputs from both bands to account for power level differences and then may compute cross-correlation coefficients using a sliding window approach with a defined confidence threshold, for example, 0.90 confidence threshold. The related signal patterns may be identified through several characteristics, such as temporal synchronization (where similar signal bursts appear in both bands with minimal time delay), spectral similarity (matching frequency components across bands indicating potential interference or legitimate multi-band transmissions), and amplitude correlation (relative signal strength patterns that occur concurrently). For example, when a correlation coefficient exceeds 0.95, it might indicate strong cross-band interference like certain microwave emissions affecting both bands, while coefficients between 0.90 and 0.95 could suggest legitimate Wi-Fi® traffic utilizing both bands for MLO operation. The processor 230 may maintain a pattern history buffer in the pattern recognition database 238 for each band and employs adaptive thresholding to distinguish between different types of related patterns, such as periodic interference (showing regular temporal patterns), burst transmissions (appearing as correlated spikes across bands), or continuous signal presence (sustained high correlation over extended periods), enabling real-time identification and classification of multi-band signal relationships.

In accordance with an embodiment, the processor 230 may be further configured to compute correlation matrices for signal segments from each first intermediate frequency band and the second intermediate frequency band for the cross-band correlation. The processor 230 may be further configured to merge correlation results using a synchronized timing reference to maintain a real-time or near real-time cross-band correlation. The correlation matrix for signal segments may refer to the relationship between signals across different intermediate frequency bands (e.g., 5 GHz and 6 GHz bands), where each element in the matrix indicates how strongly two segments may be related. For a 4×4 MIMO system with dual polarization, the correlation matrices may capture both spatial and temporal relationships between signal segments, for example, 320 MHz segments from each band (e.g., total 640 MHz bandwidth). In an implementation, the processor 230 may be configured to compute three distinct types of correlation matrices for comprehensive signal analysis across the across different intermediate frequency bands (e.g., 5 GHz and 6 GHz bands like Wi-Fi® 7 bands). For example, a spatial correlation matrix (4×4) that may compare signals between different antennas in the MIMO array showing similarity values between 0 (independent) and 1 (strongly related), a polarization correlation matrix (2×2) that may analyze vertical and horizontal polarization relationships (V-V, V-H, H-V, H-H) to understand signal propagation characteristics, and a temporal correlation matrix that tracks signal patterns and their evolution over time to identify recurring patterns or interference. Such correlation matrices may undergo a merging process where time-stamped correlation results from different time windows may be combined using exponential weighting (favoring recent data) and normalized for proper scaling—for example, in a two-window scenario, a 5 GHz antenna signal [0.5, 0.8, 0.7] correlated with a 6 GHz signal [0.4, 0.7, 0.8] might show a strong correlation of 0.92 in the first window, while the same antenna signals [0.3, 0.4, 0.2] and [0.1, 0.2, 0.3] might show a weaker correlation of 0.45 in the second window, resulting in a merged moderate correlation of 0.68 after weighted averaging. This sophisticated correlation and merging process enables real-time signal tracking across bands, interference pattern detection, understanding of spatial relationships, monitoring of polarization changes, and identification of temporal patterns, all while maintaining synchronized timing references for accurate cross-band analysis.

In accordance with an embodiment, for the cross-band correlation, the processor 230 may be further configured to determine phase coherence between signals detected in the first intermediate frequency band and the second intermediate frequency band. Further, for the cross-band correlation, the processor 230 may be further configured to track phase relationships over time to identify frequency-hopping patterns. In an implementation, the processor 230 may perform phase-based cross-band correlation by determining phase coherence between signals in the first intermediate frequency band (e.g., 5 GHZ) and the second intermediate frequency band (6 GHz), while tracking phase relationships over time to identify frequency-hopping patterns. The phase coherence determination involves measuring how well the phases align between the two bands (for example, a 5 GHz signal phase of 0.5 radians compared to a 6 GHz signal phase of 0.52π radians would yield a small phase difference of 0.02π radians, indicating high coherence with a value of 0.95), while the phase relationship tracking maintains a historical record of phase values to detect sudden changes and identify periodic patterns that might indicate frequency hopping behavior. Further, clock drift can affect phase measurements. Thus, the processor 230 may be configured to perform clock synchronization for cross-band phase analysis to maintain a common timing reference across both the first intermediate frequency (5 GHz) band sampled at 160 MHz and the second intermediate frequency (6 GHz) band sampled at 320 MHz, with nanosecond-level precision to ensure accurate phase coherence measurements. The processor 230 may continuously compensate for any clock drift between the bands by resampling signals to the highest rate (e.g., 320 MHz) and applying phase offset corrections based on timestamp comparisons, enabling precise phase relationship tracking and reliable frequency hopping pattern detection.

In accordance with an embodiment, the processor 230 may be further configured to identify related signal sources or jamming patterns (may also referred to as interference patterns) based on the determined phase coherence and the tracked phase relationships over time. Furthermore, the processor 230 may utilize the phase information to identify related signal sources or jamming patterns by analyzing both the coherence metrics and temporal phase relationships. For instance, a frequency hopping transmitter might exhibit high coherence (0.95) with synchronized phase hops every 100 ms across both bands (e.g., synchronized phase changes from 0.5π to 1.5π in both bands), while interference might show moderate coherence (0.65) with random phase changes and sporadic presence across bands. This dual approach of coherence measurement and temporal tracking enables the system to effectively distinguish between legitimate frequency-hopping signals and potential interference, providing enhanced spectrum monitoring capabilities in congested RF environment.

In accordance with an embodiment, the wireless communication device 104A may leverage cross-band correlation to validate the signal characteristics between the two intermediate frequency bands (e.g., 5 GHz and 6 GHz). The spatial analysis across the two intermediate frequency bands may provide robust signal characterization, distinguishing between legitimate traffic and potential jamming signals. Advantageously, the determined signal characteristics enable real-time adaptation of mitigation techniques, particularly in spatial nulling calculations and multi-link operation (MLO) based defense mechanisms. The continuous analysis of the signal characteristics across both frequency bands may also support the cognitive learning, such as the ANN model 232, allowing the wireless communication device 104A to improve its jammer identification and mitigation capabilities over time.

In accordance with an embodiment, the processor 230 may be further configured to detect a jamming signal and a jammer type in the digitized down-converted signals across the first intermediate frequency band and the second intermediate frequency band based on the cross-band correlation and the determined signal characteristics of the digitized down-converted signals. The processor 230 may achieve enhanced jammer detection through a synergistic combination of cross-band correlation and signal characteristics analysis across the first intermediate frequency band and second intermediate frequency band. When analyzing signals individually, the signal characteristics analysis in each intermediate frequency band may detect spatial patterns, identify power variations, and measure phase distortions, but may be limited to single band jamming signatures and may miss sophisticated jammers that mimic legitimate signals. Similarly, the cross-band correlation alone may compare signal patterns between two or more intermediate frequency bands and may track frequency-dependent behavior but may miss spatial characteristics and may not definitively identify jammer types. However, when these analyses are combined, they may create a synergistic effect that enables detection of complex jamming behaviors that would evade either method alone. In an example implementation of detection of a sophisticated frequency-hopping spatial jammer, the signal characteristics in the 5 GHz band may show unusual phase relationships between MIMO elements and strong spatial correlation patterns that could appear as legitimate MIMO transmission, while the 6 GHz band may show different but related spatial patterns and similar power profiles that could be interpreted as legitimate multi-band transmission. The cross-band correlation analysis may then reveal coordinated hopping patterns, non-natural spatial-frequency relationships, and inconsistent phase coherence across bands that cannot exist in legitimate signals. This combined analysis may allow the wireless communication device 104A to definitively identify the jammer by exposing inconsistent spatial-frequency relationships, unnatural cross-band phase coherence, and coordinated but non-legitimate pattern matching that would not be detectable through individual analyses. The processor 230 may leverage this enhanced detection capability to accurately classify complex jamming behaviors that manifest across both frequency and spatial domains, enabling selection of optimal mitigation strategies that may not be possible with single-domain analysis.

In accordance with an embodiment, in the cross-band correlation, the processor 230 may be configured to compare signal characteristics including spatial signatures, power levels, temporal patterns, and phase relationships between the first intermediate frequency band and the second intermediate frequency band. When anomalous signal patterns are detected (i.e., signal pattens that deviates from a defined legitimate signal patterns, the processor 230 may detect the jammer type by analyzing specific attributes, such as signal bandwidth, duty cycle, hopping patterns, and spatial distribution across both the intermediate bands (e.g., both the first intermediate frequency (5 GHz) and second intermediate frequency (6 GHz) bands). The detection mechanism may leverage the MLO capability to ascertain potential jamming signals, where correlated interference patterns across multiple frequency bands may indicate deliberate jamming rather than natural interference. The processor 230 may continuously update a background model, such as the ANN model 232, and the pattern recognition database 238 indicative of legitimate signal characteristics, enabling dynamic threshold adaptation for improved detection accuracy.

In an example, the processor 230 may employ advanced signal processing operations to distinguish between different types of jammers. For example, if the jammer type is detected as constant jammers, the wireless communication device 104A may detect sustained high-power signals with minimal variation. In another example, for reactive jammers, the processor 230 may detect correlation between legitimate transmission attempts and interference patterns. In yet another example, for frequency hopping jammers, the processor 230 may analyze the temporal sequence of interference across different frequency channels in both the intermediate frequency bands. The spatial analysis may track physical location and movement patterns of the detected jammers using MIMO capabilities, providing useful directional information for mitigation strategies.

In an example, the processor 230 may detect the jamming signal by identifying interference characteristics within the received digitized down-converted signals. The interference characteristics may include and not limited to Signal-to-Noise Ratio (SNR), spectral repetitions, Power Spectral Density (PSD) and the like. In an example, a sudden drop in the SNR, signifying a significant reduction in the defined signal strength may indicate presence of the jamming signal. Additionally, presence of spectral repetitions across multiple frequency bands may indicate the presence of a broadband jammer, while high power spikes in unexpected frequency ranges may strongly indicate a jamming signal. By carefully analyzing the interference characteristics, the processor 230 may effectively detect the jamming signal in the digitized down-converted signals. Once the jamming signal is detected, the processor 230 may classify the jammer type based on its temporal, spectral, and spatial properties. The jammer type may be detected as a spatial jammer or a non-spatial jammer. The spatial jammer may be jammer that may transmit signals from a specific direction. The directional characteristic can be exploited for identification using MIMO-based spatial analysis. If interference originates from a single, consistent direction, it may be indicative of a presence of the spatial jammer. Examples of the spatial jammers may include directional jammers that transmit high-power signals from a specific location, effectively creating a localized interference zone. Another example of spatial jammers may be a beamforming jammer, which may other antenna array to focus its energy on a particular target receiver, maximizing interference while minimizing impact on other directions. In contrast, the non-spatial jammer may exhibit omnidirectional interference and may be characterized by even power distribution across the MIMO antenna array 204. The presence of non-spatial jammer may be associated with frequency hopping or broadband interference, which may be evident across multiple frequency bands. Additionally, a high correlation of jamming power across the intermediate frequency bands may further reinforce the non-spatial nature of the interference source. The non-spatial jammer generally affects a wide area and does not have a fixed arrival angle.

In accordance with an embodiment, the multi-band analysis of both the first intermediate frequency (5 GHz) and second intermediate frequency (6 GHz) bands may enable robust jammer detection by exploiting the unlikelihood of legitimate signals that may exhibit highly correlated interference patterns across separate frequency bands. The cross-band correlation may reduce false positives in jammer detection since natural interference typically affects frequency bands differently. The ability of the processor 230 to detect the jammer type through multi-dimensional signal analysis across the intermediate frequency bands enables targeted mitigation strategies, where specific countermeasures may be selected based on the identified jammer characteristics or interference characteristics. Further, the continuous updating of the background model (i.e., the ANN model 232) and MLO-based validation may provide an adaptive detection system that maintains effectiveness against evolving jamming techniques. Further, the spatial analysis may allow the processor 230 to determine the physical location and movement patterns of different jammers, providing useful information for spatial nulling and other directional mitigation techniques.

In accordance with an embodiment, the processor 230 may be further configured to determine a plurality of null steering parameters based on a combination of spatial characteristics of the jamming signal, a signal-to-interference ratio (SIR) of the digitized down-converted signals, and a current state of a network performance for application of the spatial nulling to the MIMO antenna array 204. The processor 230 may continuously or periodically monitor the signal-to-interference ratio across the first intermediate frequency (5 GHz), the second intermediate frequency (6 GHz) bands and antenna elements, using MLO to validate measurements and adjust the null steering parameters accordingly. The network performance metrics such as throughput, packet error rates, and link stability may be used for the determination of the null steering parameters through a weighted optimization. The processor 230 may be configured to determine the plurality of null steering parameters for spatial nulling through a multi-factor analysis process combining three inputs, i.e. the spatial characteristics of the jamming signal, the signal-to-interference ratio of the digitized down-converted signals, and the current state of a network performance for application of the spatial nulling to the MIMO antenna array 204. In an implementation, these three inputs may be weighted and combined through an optimization operation that may generate null steering parameters (complex weights for each antenna element) that maximize jammer suppression while maintaining network performance. For example, when high SIR is detected with moderate network performance degradation, the processor 230 may compute less aggressive null steering parameters to maintain broader spatial coverage. However, when low SIR is detected with significant network performance impact, the processor 230 may generate more focused null patterns through precise weight calculations that create deeper spatial nulls in the jammer's direction. The processor 230 may continuously update these parameters based on real-time changes in spatial characteristics, SIR measurements, and network performance metrics, enabling dynamic adaptation of the spatial nulling strategy. This multi-factor approach may ensure optimal null steering that balances effective jammer suppression with overall network performance maintenance by considering both the immediate jamming impact and broader system requirements. The integration of real-time network state information with spatial and interference metrics may allow the wireless communication device 104A to dynamically balance interference mitigation against overall network quality, producing optimal null patterns that adapt to changing network conditions.

In accordance with an embodiment, the processor 230 may be further configured to apply spatial nulling to the MIMO antenna array 204 of the wireless communication device 104A to dynamically suppress the jamming signal without affecting signals-of-interest in the digitized down-converted signals when the jammer type is a spatial jammer. The processor 230 may apply spatial nulling through an adaptive beamforming process that may dynamically compute and update complex antenna weights for the MIMO antenna array 204. Based on the calculated null steering parameters, the processor 230 may generate a null pattern by adjusting the amplitude and phase of each antenna element to create destructive interference in the jammer's direction while maintaining constructive interference for signals-of-interest. The nulling implementation may include real-time computation of antenna weight vectors using constrained optimization techniques that may minimize power reception from the jammer's spatial location while maximizing the signal-to-interference-plus-noise ratio (SINR) for desired signals. The processor 230 may continuously adjust the null pattern using a feedback loop that monitors residual interference levels and jammer movement through spatial tracking, enabling dynamic suppression that follows mobile jammers. In the adaptive beamforming, radiation pattern of the MIMO antenna array 204 may be adjusted in real-time to optimize signal reception. The processor 230 may execute adaptive beamforming using the 4×4 MIMO antenna array 204 through a two-fold process. Firstly, the processor 230 may be configured to dynamically enhance signal reception in desired directions by computing and applying optimal beamforming weights (amplitude and phase), for example, based on Minimum Variance Distortion Less Response. For example, if a signal-of-interest is detected at 30 degrees, the processor 230 may calculate complex weights for each antenna element to form a beam maximum in that direction. Concurrently, null steering may be executed by projecting such beamforming weights onto the null space of interference directions. For example, if interference is detected at 90 degrees, the processor 230 may modify the beamforming weights to create a spatial null in that direction while maintaining the desired beam pattern. The weights may be continuously updated based on changing signal conditions, where the processor 230 may utilize spatial covariance estimation and interference-plus-noise modeling to optimize the beam pattern, achieving both objectives of signal enhancement and interference suppression concurrently. For example, when an interference source moves (e.g., one of the moving interference sources 114) from 90° to 100°, the processor 230 may immediately recalculate weights to shift the null position while preserving desired signal reception, thereby enabling dynamic interference rejection, consistent signal enhancement, and real-time beam pattern optimization for robust spectrum monitoring. In other words, the processor 230 may be further configured to maintain null positions for the null steering through adaptive tracking of the moving interference sources 114.

In accordance with an embodiment, the processor 230 may be configured to perform a null depth optimization operation where the processor 230 may dynamically adjust both a null width and a null depth based on interference source velocity of the moving interference sources 114. For example, when tracking a fast-moving interference source at 10 degrees per second, it creates a wider 15-degree null with −25 dB suppression, whereas for slower-moving sources at 2 degrees per second, it generates a narrower 5-degree null with −40 dB suppression, thereby achieving optimal interference suppression while maintaining tracking effectiveness. Advantageously, this null depth optimization operation ensures that nulls effectively follow the moving interference sources 114 while maintaining desired signal reception, with the null characteristics automatically optimizing based on the dynamic nature of the interference.

In accordance with an embodiment, the processor 230 may be further configured to activate a jammer defense function to switch communication to an unaffected intermediate frequency band when the jammer type is a non-spatial jammer and the jamming signal is detected on a primary intermediate frequency band. The primary intermediate frequency band may be one of the first intermediate frequency (5 GHZ) band or the second intermediate frequency (6 GHz) band. The processor 230 may activate the jammer defense function by implementing a multi-stage frequency switching mechanism utilizing, for example, using MLO capabilities. Upon detecting the non-spatial jammer in the primary intermediate frequency band, the processor 230 may initiate concurrent assessment of signal quality and interference levels across both the first intermediate frequency (5 GHz) band and the second intermediate frequency (6 GHZ) band. The MLO-based defense mechanism may enable seamless transition by maintaining concurrent connections across multiple intermediate frequency bands, where the processor 230 may dynamically reassign active communication links to the unaffected intermediate frequency band. The switching process may involve real-time coordination of frequency synthesizer settings, baseband processing parameters, and power levels. In an example, when a secondary intermediate frequency band is occupied, the processor 230 may employ Dynamic Frequency Selection (DFS) to scan and identify optimal frequencies within the unaffected band. The processor 230 may also adjust transmission power and modulation schemes to maintain link quality during the transition, while continuously monitoring both the intermediate frequency bands for potential jammer migration. The MLO capability of the wireless communication device 104A may be exploited to enable uninterrupted communication through concurrent multi-band operation, where the wireless communication device 104A may maintain active links across the intermediate frequency bands during switching transitions. The dynamic frequency selection and adaptive power adjustment by the processor 230 may establish resilient communication paths that may rapidly respond to jamming conditions. The integration of MLO with cognitive learning of the ANN model 232 may enable predictive band switching based on historical jamming patterns and performance metrics, minimizing switching latency and maintaining network stability. For example, when interference is detected at 5 GHz, the processor 230 may seamlessly transition active MLO links to 6 GHz while maintaining session continuity results from the combined application of concurrent band monitoring, adaptive power control, and intelligent frequency selection mechanisms.

In accordance with an embodiment, the processor 230 may be further configured to perform a correlation of threat signatures of a threat type for the detected jamming signal across the first intermediate frequency band and the second intermediate frequency band. The processor 230 may perform threat signature correlation by analyzing distinct characteristics of the spatial jammers and the non-spatial jammers across the first intermediate frequency (5 GHz) band and the first intermediate frequency (6 GHz) band. In an example, for the spatial jammers, the correlation may focus on spatial parameters including angle of arrival consistency, spatial power distribution patterns, and directional characteristics across both the intermediate frequency bands. The processor 230 may calculate spatial correlation matrices and compare spatial signatures between the first intermediate frequency band and the second intermediate frequency band using MLO capabilities. In another example, for the non-spatial jammers, the correlation may analyze frequency-domain characteristics such as bandwidth occupation, spectral spread, power variations, and temporal patterns across the intermediate frequency bands. The processor 230 may employ cross-band validation (e.g. through MLO) to verify the threat signatures by computing correlation coefficients between the intermediate frequency bands for each jammer type. This dual-band correlation approach enables precise classification of jammer types by exploiting their unique spatial or spectral characteristics, where spatial jammers exhibit consistent directional properties while non-spatial jammers show correlated frequency-domain patterns across the intermediate frequency bands. Upon successful correlation and threat type identification, the processor 230 may associate a specific jammer defense action with each threat type dynamically that causes the mitigation success of the jamming signal with the threat type. In an example, the jammer defense action may include spatial nulling for directional threats, band switching for frequency-specific jammers, or adaptive power/modulation adjustments for intelligent jammers. Additionally, the processor 230 may continuously update associations of the jammer defense action through cognitive learning algorithms that track mitigation success rates.

In accordance with an embodiment, the processor 230 may be further configured to detect synchronous jammer signal patterns between the first intermediate frequency band and the second intermediate frequency band based on the cross-band correlation and the determined signal characteristics of the digitized down-converted signals. The processor 230 may be configured to compute temporal alignment metrics, phase relationships, and spectral coherence between digitized down-converted signals from both the intermediate frequency bands and specifically focus on synchronized variations occurring within the predetermined time window. The processor 230 may be further configured to determine coordinated jamming activities when the detected synchronous jammer signal patterns occur within a predetermined time window. In an example, for the coordinated jamming determination, the processor 230 may implement a multi-stage validation process where initial detection of synchronous patterns may trigger enhanced analysis of timing relationships, frequency transitions, and power variations between the intermediate frequency bands. The processor 230 may maintain a sliding time window analysis that may track pattern synchronization by using cross-correlation coefficients, coherence metrics, and/or phase alignment measurements. In an implementation, when the synchronous patterns are detected within the time window, the processor 230 may employ cognitive learning, such as the ANN model 232, to validate the coordination by analyzing historical pattern data and temporal relationships.

In accordance with an embodiment, the processor 230 may be further configured to perform a cross-band validation on the digitized down-converted signals to confirm a mitigation success of the jamming signal. In the cross-band validation process, the processor 230 may re-compute multi-link operation (MLO) parameters such as key performance indicators including signal-to-interference ratios, packet error rates, and throughput measurements before and after the mitigation. The processor 230 may analyze the MLO parameters through concurrent processing of both the intermediate frequency bands, enabling real-time assessment of mitigation effectiveness.

In accordance with an embodiment, the processor 230 may be further configured to measure post-mitigation interference levels in each of the first intermediate frequency band and the second intermediate frequency band based on a re-processing of the digitized down-converted signals across the first intermediate frequency band and the second intermediate frequency band. The re-processing of the digitized down-converted signals across the first intermediate frequency band and the second intermediate frequency band may be based on the configuration or re-configuration of the MLO parameters in the wireless communication device 104A.

In accordance with an embodiment, the processor 230 may be further configured to compare signal quality metrics before and after the cross-band validation when the mitigation success of the jamming signal is confirmed. The processor 230 may be further configured to detect residual jamming patterns of the jamming signal across the first intermediate frequency band and the second intermediate frequency band. For the residual jamming detection, the processor 230 may employ spectral analysis, temporal correlation, or spatial signature matching to identify any remaining interference patterns across both the intermediate frequency bands. The validation may include continuous monitoring of signal characteristics to detect potential jammer adaptation. The MLO-based cross-band validation may generate comprehensive mitigation assessment by leveraging dual-band analysis, where concurrent monitoring of both the intermediate frequency bands enable detection of jammer migration or partial suppression. The ability of the processor 230 to compare pre-mitigation and post-mitigation metrics while tracking residual interference patterns may result from the integrated application of concurrent band processing and cognitive learning of the ANN model 232. The real-time validation across multiple intermediate frequency bands, combined with continuous metric comparison and residual pattern detection, enables dynamic adjustment of mitigation strategies based on validated effectiveness measurements. This cross-band validation approach ensures sustained communication quality by identifying and addressing partial mitigation scenarios or adaptive jamming behaviors that might otherwise go undetected in single-band systems.

In accordance with an embodiment, the processor 230 may be further configured to periodically update a pattern recognition database 238 with the determined jamming patterns of the plurality of different jamming signals. The processor 230 may be further configured to execute an artificial neural network model i.e., the ANN model 232, to determine jamming patterns of a plurality of different jamming signals over time based on a result of each cross-band correlation event and each spatial analysis event of the digitized down-converted signals. The ANN model 232 may analyze the jamming patterns of the different jamming signals by processing feature vectors extracted from each cross-band correlation and spatial analysis event. In an example, the feature vectors may comprise and not limited to temporal signatures, frequency characteristics, power profiles, and spatial distributions across both the intermediate frequency bands. The processor 230 may continuously update the pattern recognition database 238 by storing validated jamming patterns, mitigation outcomes, and interference characteristics identified through the MLO-based cross-band analysis. In an example, to update the pattern recognition database 238, the processor 230 may implement a hierarchical storage structure where new jamming patterns are classified based on the threat types, temporal characteristics, and mitigation effectiveness metrics. The learning process may include periodic retraining of the ANN model 232 using accumulated pattern data, enabling adaptive recognition of evolving jamming techniques.

In accordance with an embodiment, the processor 230 may be further configured to periodically adjust the jammer defense function based on learned jamming patterns and jamming characteristics from the updated pattern recognition database and the cross-band validation to handle a next jamming signal mitigation event. In an example, the adjusting of the jammer defense function may comprise refinement of spatial nulling parameters, adjustment of band-switching thresholds, and modification of mitigation strategy selection criteria based on historical effectiveness data. The cognitive learning implementation by the processor 230 may create evolving defense mechanisms that adapt to new jamming techniques, where the integration of MLO capabilities with neural network processing enables rapid jamming pattern recognition across multiple intermediate frequency bands. The ability of the wireless communication device 204A, to continuously learn and adapt its defense strategies while maintaining real-time processing capabilities may result from the combined application of neural network analysis, pattern database management, and cross-band validation techniques, producing increasingly effective mitigation responses to emerging jamming threats.

In accordance with an embodiment, the RF signals may comprise one or more of legitimate signal communications (e.g., from legitimate signal sources 108), potential jamming signals (e.g., from the signal jamming sources 110), frequency hopping transmissions (e.g., from the moving interference sources 114), or unknown or anomalous signals tagged for further analysis (e.g., from the unknown signal sources 112).

Figure 3A:
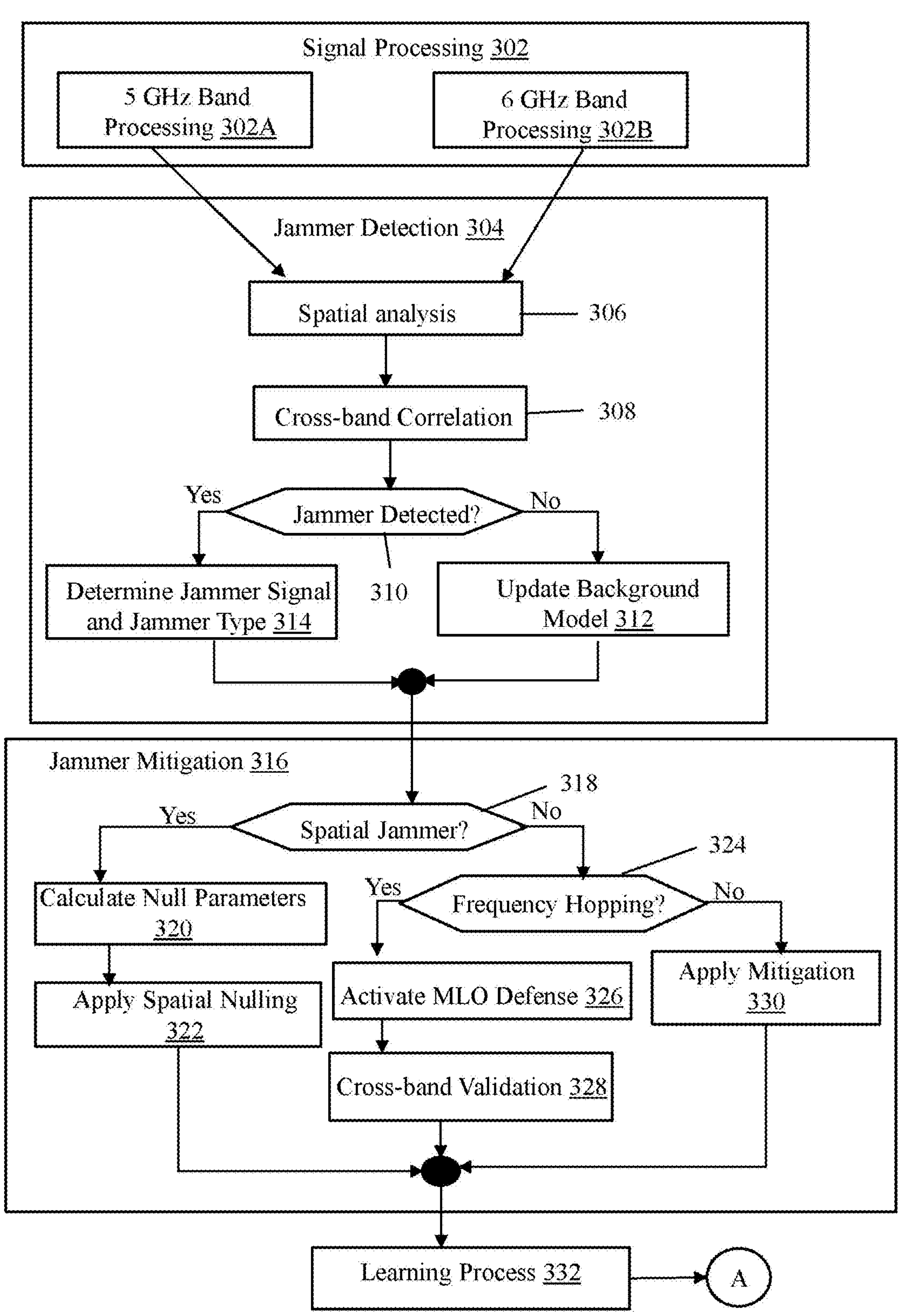
FIGS. 3A and 3B, collectively is a diagram that illustrates an exemplary scenario for implementation of a wireless communication device for a real-time or near real-time jamming signals mitigation, in accordance with an exemplary embodiment of the disclosure.
Figure 3B:
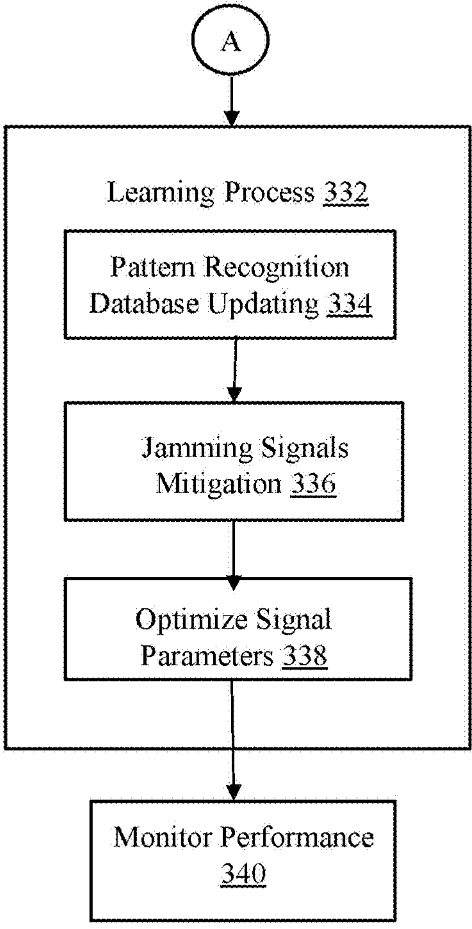
Figure 4A:
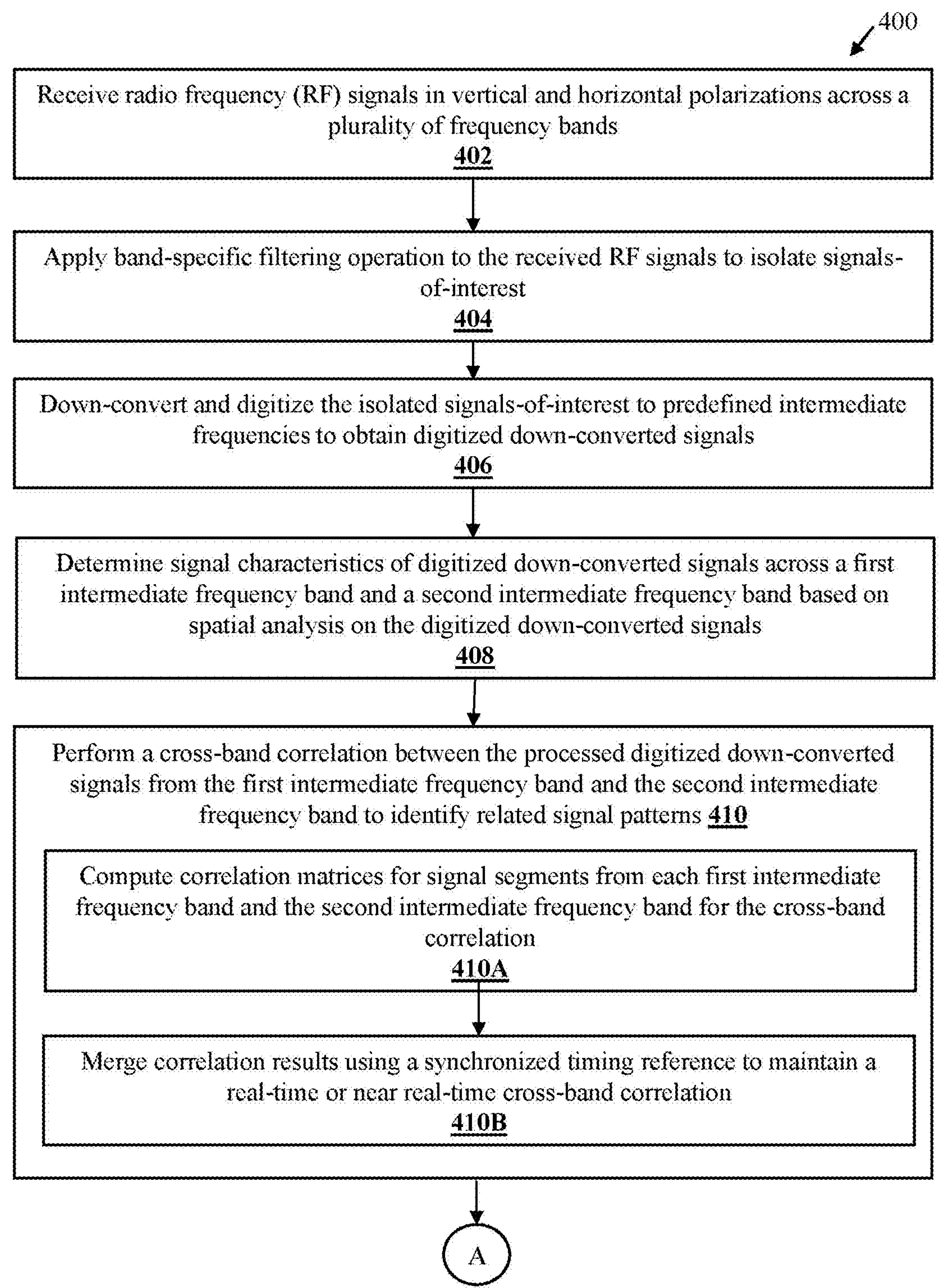
Figure 4C:
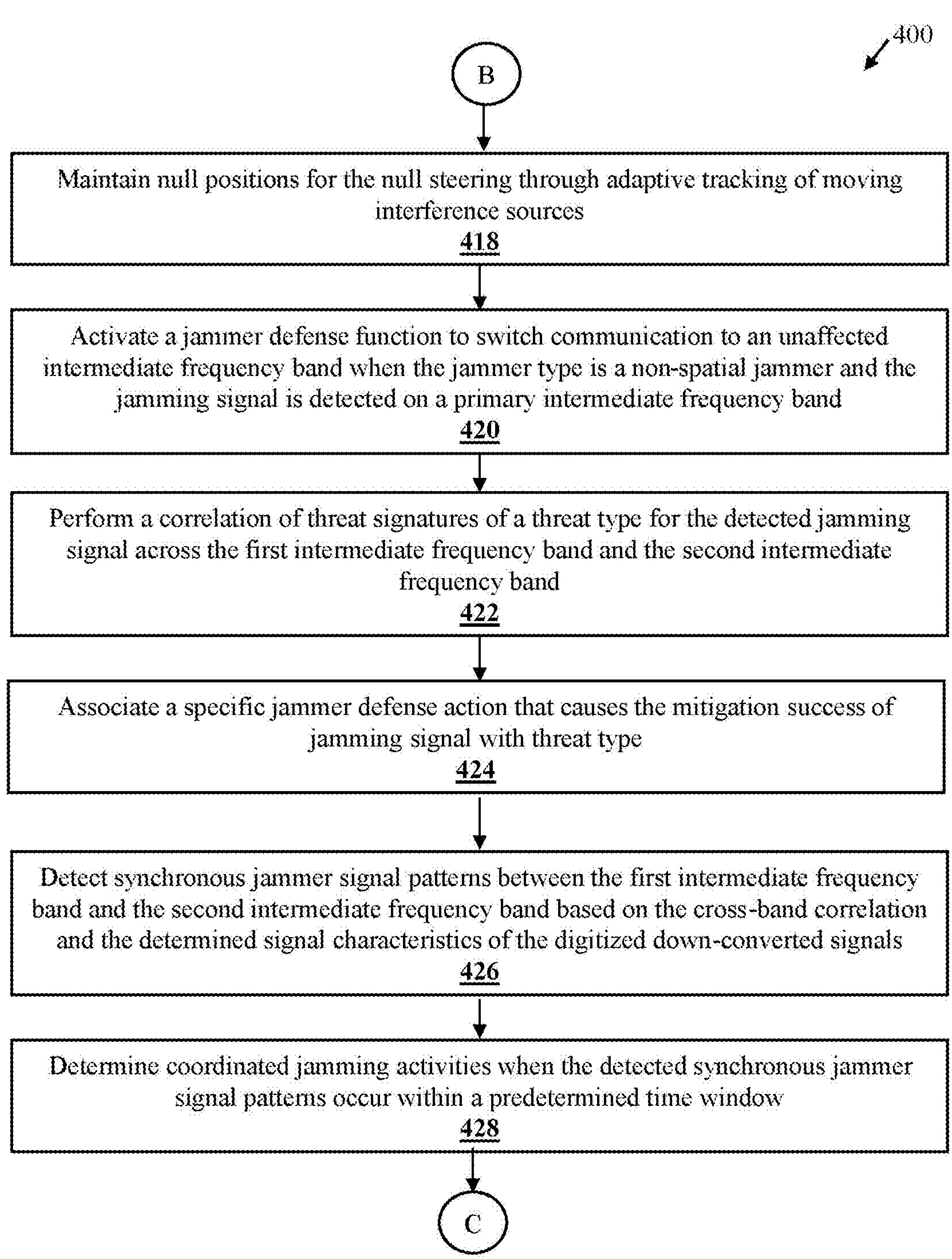
Figure 4D:
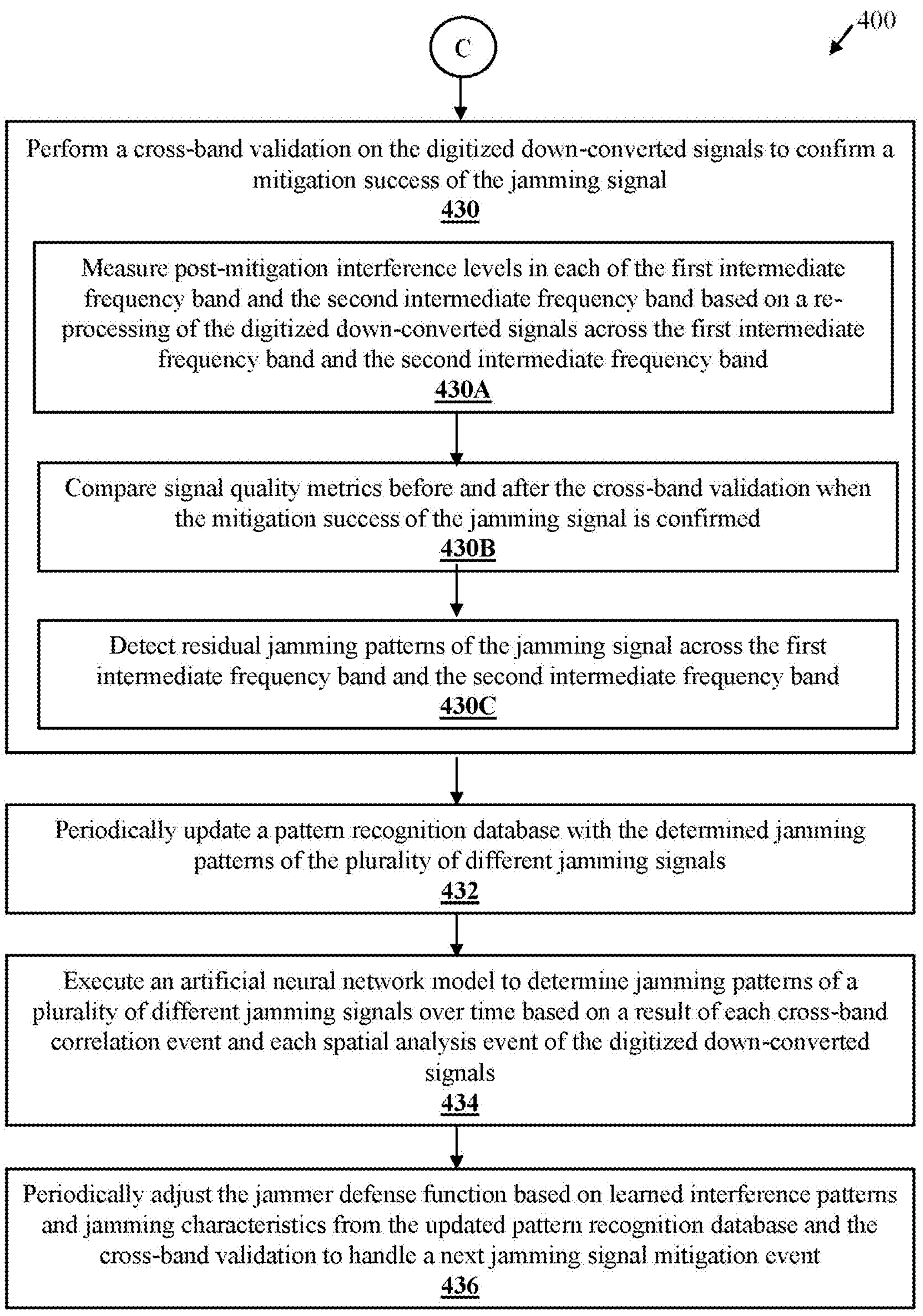

FIG. 3A and FIG. 3B are diagrams illustrating exemplary scenarios for of implementation of a wireless communication device 104A for the real-time or near real-time jamming signals mitigation, in accordance with an exemplary embodiment of the disclosure. FIG. 3A and FIG. 3B are explained in conjunction with elements from FIGS. 1 and 2. With reference to FIG. 3A and FIG. 3B, there is shown an exemplary signal processing pipeline using operations 302 to 338 for an exemplary scenario of concurrent processing of 5 GHz and 6 GHz signals that belong to WLAN frequency band (e.g., Wi-Fi® 7/6E frequency band). In this exemplary scenario, the wireless communication device 104A may integrate MIMO and MLO capabilities within a Wi-Fi® 7 or 6E-enabled system to enhance spectrum monitoring, signal detection, and cross-band correlation. In accordance with one embodiment, MIMO architecture may be utilized to improve spatial resolution and direction finding, while MLO facilitates cross-band validation, thereby improving accuracy of jammer detection and reducing false positives. The integration of MIMO and MLO within the Wi-Fi® 7 framework enables optimized spectrum utilization, interference mitigation, and adaptive signal analysis across multiple frequency bands, providing a robust and efficient solution for real-time or near real-time jamming signals mitigation.

At operation 302, concurrent processing of the received RF signals may be performed across multiple intermediate frequency bands. The signal processing stage may comprise, for example, dual-band analysis, i.e. processing of the digitized down-converted signals in the first intermediate frequency (e.g. 5 GHZ) band and the second intermediate frequency (e.g. 6 GHz) band.

At operation 304, jammer detection may occur. The detection mechanism may operate through multiple coordinated sub-stages, such as from operation 306 to 314. At operation 306, spatial analysis may be performed. In the spatial analysis, the processor 230 may evaluate signal parameters such as angle of arrival metrics and spatial distribution patterns using the MIMO antenna array 204. At operation 308, the cross-band correlation between the processed digitized down-converted signals from the first intermediate frequency band and the second intermediate frequency band to identify related signal patterns may be performed. The cross-band correlation may enable detection of spatial jammers and non-spatial jammers. At operation 310, it may be checked whether a jamming signal is detected or not detected. The processor 230 may implement adaptive thresholding based on current signal conditions. Upon detection, the processor 230 may either update background models, such as the ANN model 232, at operation 312 or proceed to determination of jammer signal and jammer type at operation 314. Further, at the operation 314, threat signatures that may include spectral properties, temporal patterns, and spatial distributions across both the intermediate frequency bands may be extracted. The processor 230 may use the ANN model 232 to classify threats through pattern matching against known or prestored signatures or patterns in the pattern recognition database 238.

At operation 316, jammer mitigation may occur. The mitigation mechanism may operate through multiple coordinated sub-stages such as from operation 318 to 330. The processor 230 may activate specific mitigation strategies based on the jammer type such as spatial jammers and non-spatial jammers. At 318, it may be determined whether the jammer type is spatial jammer or a non-spatial jammer. If the jammer type is determined as the spatial jammers, at operation 320, null steering parameters (also referred to as null parameters) may be calculated based on a combination of spatial characteristics of the jamming signal, a signal-to-interference ratio of the digitized down-converted signals, and a current state of a network performance for application of the spatial nulling to the MIMO antenna array 204. At operation 322, the spatial nulling is applied to the MIMO antenna array 204 of the wireless communication device 104A to dynamically suppress the jamming signal without affecting signals-of-interest in the digitized down-converted signals. If the jammer type is determined as the non-spatial jammers such as frequency hopping jammer, at operation 324, the jammer defense function such as MLO defense function may be activated to switch communication to an unaffected intermediate frequency band when the jammer type is a non-spatial jammer and the jamming signal is detected on a primary intermediate frequency band at operation 326. The primary intermediate frequency band is one of the first intermediate frequency band or the second intermediate frequency band. At operation 328, cross-band validation on the digitized down-converted signals may be performed to confirm a mitigation success of the jamming signal across the intermediate frequency bands. If the jammer type is determined as the non-frequency hopping jammer, at operation 330, a general mitigation or carrier-specific mitigation strategy may be applied to adjust modulation or power parameters to minimize jammer impact.

At operation 322, the learning process may operate through multiple coordinated sub-stages such as from operation 334 to 338. At operation 334, the pattern recognition database 238 may be updated with the determined jamming patterns of the plurality of different jamming signals periodically. At operation 336, mitigation of the jamming signals is performed based on historical performance analysis. At operation 338, optimization of signal parameters is performed using validated mitigation results. At operation 340, monitoring of performance may occur continuously or periodically to evaluate effectiveness of the wireless communication device 104A.

In contrast to conventional systems and devices, the disclosed wireless communication device 104A and method achieve real-time or near real-time jamming signals mitigation across multiple frequency bands through intelligent integration of MIMO, MLO technologies and cognitive learning through ANN model. For example, traditional jammer mitigation approaches typically rely on single-band detection and predetermined countermeasures, limiting their effectiveness against sophisticated jamming threats. The disclosed wireless communication device 104A and method overcomes these limitations through integration of spatial nulling, MLO-based resistance, and cognitive learning algorithms. The unique dual-band processing of the wireless communication device 104A concurrently handling of 5 GHz and 6 GHz bands, may enable immediate cross-validation of potential jamming signals—a capability absents in existing solutions. The multi-band approach, combined with spatial analysis and cross-band correlation may significantly reduce false positives while maintaining system responsiveness, addressing a critical weakness in current technologies. Further, the adaptive mitigation strategy represents a marked departure from static approaches found in prior art. By implementing a dynamic decision that selects between spatial nulling and MLO-based defense mechanisms based on real-time determination of jammer type, the wireless communication device 104A may provide superior protection against diverse jamming threats. The concurrent calculation of null steering parameters while applying generic mitigation strategy through MLO demonstrates technical advancement over sequential mitigation approaches. In addition, the cognitive learning component continuously evolves its defense mechanisms by refining the background model and jammer determination. This selfimproving capability stands in stark contrast to conventional fixed-strategy systems, enabling the wireless communication device 104A to maintain effectiveness against emerging jamming techniques while minimizing impact on legitimate communications.

In contrast to conventional systems and devices (e.g. conventional spectrum analyzers) requiring dedicated hardware for different frequency bands, embodiments herein advantageously utilize commercial WLAN chipsets (e.g., IEEE 802.11be chipset and modems) with intelligent signal down conversion and signal processing architectures as described to achieve wide frequency range coverage (DC to 100 or 300 GHz) in a cost-effective manner. The disclosed MIMO-MLO integration enables capabilities previously requiring multiple expensive dedicated instruments. For example, the received RF signals captured from air of 0-100+ GHz may be down converted and digitized to desired intermediate frequencies, for example, frequencies like (5 GHz and 6 GHz) capable of being processed firstly in the WLAN chipset, which not only simplifies the signal processing but also reduces the cost effectively without any compromise in spectrum analysis results. For example, there is no need for expensive ADCs to handle high-bandwidth signal capture (e.g., >7 GHZ) directly, and complex signal processing hardware due to down conversion to desired intermediate frequencies. The real-time cross-band correlation between different intermediate frequency bands, enabled by MLO parameters, allows detection of related signal patterns across frequency bands-a capability absent in traditional single-band analyzers. This cross-correlation technique provides improved interference rejection and signal characterization. Furthermore, the signal analysis may be an AI-enhanced signal analysis using the ANN model 232.

In accordance with an embodiment, the training of the ANN model 232 for spectrum monitoring may follow a structured approach that may integrate deep learning techniques with real-time RF signal processing. In an exemplary implementation, the ANN model 232 may be used for identifying recurring signal patterns at each event of the cross-band correlation. The ANN model 232 may enable adaptive spectrum analysis by leveraging a combination of deep learning, specifically using CNNs, LSTMs, and Transformer-based architectures to recognize complex RF signatures. The training process may include data acquisition and preprocessing, where the system 100 may use some test wireless communication devices (e.g., like the wireless communication devices 104A, 104B, 104C, . . . , 104N) and capture RF signals using a 4×4 MIMO antenna array, such as the MIMO antenna array 204, which may support dual-polarization and operates from DC to 100 GHz or DC to 300 GHz. The signal filtering and conversion may be applied before digitization, using band-specific filtering operation to isolate signals of interest. Further, FFT and wavelet transforms may be used for spectral analysis, ensuring frequency-domain features are extracted. Thereafter, feature extraction may occur. The system 100 may apply multi-dimensional analysis combining spectral, temporal, and spatial processing to enhance detection accuracy. Further, MLO-based cross-band correlation may be used to align data from predefined frequency bands like the 5 GHz and 6 GHz bands. Further, features, such as modulation type, frequency components, jamming patterns, and spatial signatures may be extracted. Thereafter, the ANN model 232 may be trained using labeled historical datasets stored in the pattern recognition database 238. The convolutional neural network (CNN) layers may be used to handle spatial features, while the Long short-term memory (LSTM) layers may be used for sequential pattern detection over time. Further, to further enhance detection and classification of signals, transformer-based models may be deployed for contextual feature learning and adaptive anomaly detection. The federated learning techniques may be employed to enable distributed training across multiple nodes for real-time adaptation to obtain the trained ANN model 232.

In accordance with an embodiment, performance optimization to optimize network parameters may be carried out using Bayesian hyperparameter tuning. Further, Pruning, quantization, and knowledge distillation may help reduce computational overhead. The trained ANN model 232 may undergo real-time updates via online learning algorithms to adapt to new jamming patterns. Examples of the online learning algorithms used may include Multi-Armed Bandit (MAB) Algorithms, Deep Q-Networks (DQN) for Spectrum Adaptation, or Incremental Learning (Online Backpropagation). Each node in the wireless mesh network 106 may contribute to global model updates (e.g., at the central cloud server 102) without sharing raw data. For example, learned interference features may be shared across different locations to enhance pattern recognition.

Furthermore, during execution, the trained ANN model 232 may process incoming RF data to detect signal anomalies, classify threats, and support dynamic spectrum reallocation. The system 100 may integrate edge computing for local signal classification and the central cloud server 102 (cloud ANN model) for large-scale anomaly detection. The trained ANN model 232 allows AI-enhanced spectrum monitoring enhanced real-time threat detection, dynamic signal classification, cross-band interference mitigation, and autonomous spectrum adaptation. By leveraging the Peltbeam's ANN model, such as the ANN model 232, wireless spectrum sensing, signal identification, and interference analysis may be significantly enhanced across a wide range of frequency bands (DC to 300 GHz).

FIGS. 4A, 4B, 4C and 4D collectively, is a flowchart of a method for real-time or near real-time jamming signals mitigation, in accordance with an embodiment of the disclosure. FIGS. 4A, 4B, 4C and 4D are explained in conjunction with elements from FIGS. 1, 2, 3A and 3B. With reference to 4A, 4B, 4C and 4D, there is shown a flowchart of a method 400 comprising exemplary operations 402 through 444. The method 400 may be implemented in any of the wireless communication devices 104A, 104B, 104C, . . . , 104N.

At 402, radio frequency (RF) signals may be received in vertical and horizontal polarizations across a plurality of frequency bands.

At 404, band-specific filtering operation may be applied to the received RF signals to isolate signals-of-interest.

At 406, the isolated signals-of-interest may be down-converted and digitized to predefined intermediate frequencies to obtain digitized down-converted signals.

At 408, the signal characteristics of the digitized down-converted signals across the first intermediate frequency band and a second intermediate frequency band based on the spatial analysis on the digitized down-converted signals.

At 410, a cross-band correlation may be performed between the processed digitized down-converted signals from the first intermediate frequency band and the second intermediate frequency band to identify related signal patterns. The operation 410 may include one or more sub-operations, such as operations 410A to 410E.

At 410A, correlation matrices may be computed for signal segments from each first intermediate frequency band and the second intermediate frequency band for the cross-band correlation. At 410B, correlation results may be merged using a synchronized timing reference to maintain a real-time or near real-time cross-band correlation. At 410C, phase coherence may be determined between signals detected in the first intermediate frequency band and the second intermediate frequency band. At 410D, phase relationships may be tracked over time to identify frequency-hopping patterns. At 410E, related signal sources or jamming patterns may be identified based on the determined phase coherence and the tracked phase relationships over time.

At 412, the jamming signal and the jammer type in the digitized down-converted signals may be determined across the first intermediate frequency band and the second intermediate frequency band based on the cross-band correlation and the determined signal characteristics of the digitized down-converted signal.

At 414, a plurality of null steering parameters may be determined based on a combination of spatial characteristics of the jamming signal, a signal-to-interference ratio of the digitized down-converted signals, and a current state of a network performance for application of the spatial nulling to the MIMO antenna array 204.

At 416, the spatial nulling to the MIMO antenna array 204 of the wireless communication device 104A may be applied to dynamically suppress the jamming signal without affecting signals-of-interest in the digitized down-converted signals when the jammer type is a spatial jammer.

At 418, null positions may be maintained for the null steering through adaptive tracking of moving interference sources 114.

At 420, a jammer defense function may be activated to switch communication to an unaffected intermediate frequency band when the jammer type is a non-spatial jammer and the jamming signal is detected on a primary intermediate frequency band.

At 422, a correlation of threat signatures of a threat type for the detected jamming signal may be performed across the first intermediate frequency band and the second intermediate frequency band.

At 424, a specific jammer defense action may be associated that causes the mitigation success of the jamming signal with the threat type.

At 426, synchronous jammer signal patterns may be detected between the first intermediate frequency band and the second intermediate frequency band based on the cross-band correlation and the determined signal characteristics of the digitized down-converted signals.

At 428, coordinated jamming activities may be determined when the detected synchronous jammer signal patterns occur within a predetermined time window.

At 430, a cross-band validation may be performed on the digitized down-converted signals to confirm a mitigation success of the jamming signal. The operation 430 may include one or more sub-operations, such as operations 436A to 436C.

At 430A, post-mitigation interference levels may be measured in each of the first intermediate frequency band and the second intermediate frequency band based on a re-processing of the digitized down-converted signals across the first intermediate frequency band and the second intermediate frequency band. At 430B, signal quality metrics may be compared before and after the cross-band validation when the mitigation success of the jamming signal is confirmed. At 430C, residual jamming patterns of the jamming signal may be detected across the first intermediate frequency band and the second intermediate frequency band.

At 432, a pattern recognition database may be updated periodically with the determined jamming patterns of the plurality of different jamming signals At 434, an artificial neural network model may be executed to determine jamming patterns of a plurality of different jamming signals over time based on a result of each cross-band correlation event and each spatial analysis event of the digitized down-converted signals.

At 436, the jammer defense function may be periodically adjusted based on learned interference patterns and jamming characteristics from the updated pattern recognition database and the cross-band validation to handle a next jamming signal mitigation event.

Various embodiments of the disclosure may provide the wireless communication device 104A. The wireless communication device 104A may include the processor 230 configured to determine signal characteristics of digitized down-converted signals across a first intermediate frequency band and a second intermediate frequency band based on spatial analysis on the digitized down-converted signals. The processor 230 may be further configured to perform cross-band correlation between the digitized down-converted signals across the first intermediate frequency band and the second intermediate frequency band to identify related signal patterns. The processor 230 may be further configured to detect a jamming signal and a jammer type in the digitized down-converted signals across the first intermediate frequency band and the second intermediate frequency band based on the cross-band correlation and the determined signal characteristics of the digitized down-converted signals. The processor 230 may be further configured to apply spatial nulling to the MIMO antenna array 204 of the wireless communication device 104A to dynamically suppress the jamming signal without affecting signals-of-interest in the digitized down-converted signals when the jammer type is a spatial jammer. The processor 230 may be further configured to activate a jammer defense function to switch communication to an unaffected intermediate frequency band when the jammer type is a non-spatial jammer and the jamming signal is detected on a primary intermediate frequency band, wherein the primary intermediate frequency band is one of the first intermediate frequency band or the second intermediate frequency band. The processor 230 may be further configured to perform a cross-band validation on the digitized down-converted signals to confirm mitigation success of the jamming signal.

Various embodiments of the disclosure may provide a computer program product for spectrum sensing across multiple frequency bands, the computer program product comprising a non-transitory computer-readable storage medium having program instructions embodied therewith, the program instructions are executable by a system to cause the system to execute operations, the operations comprising determining signal characteristics of digitized down-converted signals across a first intermediate frequency band and a second intermediate frequency band based on spatial analysis on the digitized down-converted signals. The operations may further comprise performing cross-band correlation between the digitized down-converted signals across the first intermediate frequency band and the second intermediate frequency band. The operations may further comprise detecting a jamming signal and a jammer type in the digitized down-converted signals across the first intermediate frequency band and the second intermediate frequency band based on the cross-band correlation and the determined signal characteristics of the digitized down-converted signals. The operations may further comprise applying spatial nulling to a multiple-input-multiple-output (MIMO) antenna array 204 of the wireless communication device 104A to dynamically suppress the jamming signal without affecting signals-of-interest in the digitized down-converted signals when the jammer type is a spatial jammer. The operations may further comprise activating a jammer defense function to switch communication to an unaffected intermediate frequency band when the jammer type is a non-spatial jammer and the jamming signal is detected on a primary intermediate frequency band, wherein the primary intermediate frequency band is one of the first intermediate frequency band or the second intermediate frequency band. The operations may comprise performing a cross-band validation on the digitized down-converted signals to confirm mitigation success of the jamming signal.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication device, comprising:

a multiple-input-multiple-output (MIMO) antenna array that comprises a plurality of dual-polarized antennas configured to receive radio frequency (RF) signals in vertical and horizontal polarizations across a plurality of frequency bands;

a radio frequency (RF) frontend coupled to the MIMO antenna array and configured to:

apply a band-specific filtering operation to the received RF signals to isolate signals-of-interest; and down-convert and digitize the signals-of-interest to predefined intermediate frequencies to obtain digitized down-converted signals; and a processor configured to:

determine signal characteristics of the digitized down-converted signals across a first intermediate frequency band and a second intermediate frequency band based on spatial analysis on the digitized down-converted signals, wherein the signal characteristics comprise temporal signal properties, spatial properties from MIMO antenna inputs, and polarization properties corresponding to vertical and horizontal components.

2. The wireless communication device according to claim 1, wherein the processor is further configured to:
- perform cross-band correlation between the digitized down-converted signals across the first intermediate frequency band and the second intermediate frequency band;
- detect a jamming signal and a jammer type in the digitized down-converted signals across the first intermediate frequency band and the second intermediate frequency band based on the cross-band correlation and the determined signal characteristics of the digitized down-converted signals;
- apply spatial nulling to the MIMO antenna array of the wireless communication device to dynamically suppress the jamming signal without affecting the signals-of-interest in the digitized down-converted signals when the jammer type is a spatial jammer;
- activate a jammer defense function to switch communication to an unaffected intermediate frequency band when the jammer type is a non-spatial jammer and the jamming signal is detected on a primary intermediate frequency band, wherein the primary intermediate frequency band is one of the first intermediate frequency band or the second intermediate frequency band; and
- perform a cross-band validation on the digitized down-converted signals to confirm a mitigation success of the jamming signal.

3. The wireless communication device according to claim 2, wherein the plurality of frequency bands captured by the MIMO antenna array ranges from direct current (DC) to 300 gigahertz (GHz), and wherein the wireless communication device is a multi-functional device for mitigation of the jamming signal as well as wireless data communication to one or more other wireless communication devices in a wireless mesh network.

4. The wireless communication device according to claim 2, wherein the first intermediate frequency band is different from the second intermediate frequency band, and wherein each of the predefined intermediate frequencies corresponding to the first intermediate frequency band and the second intermediate frequency band is one of: 2.4 gigahertz (GHz), 5 GHZ, 6 GHZ, 7 GHZ, or other unlicensed or Industrial, scientific, and medical (ISM) frequency band.

5. The wireless communication device according to claim 2, wherein, for the cross-band correlation, the processor is further configured to:
- determine phase coherence between signals detected in the first intermediate frequency band and the second intermediate frequency band;
- track phase relationships over time to identify frequency-hopping patterns; and
- identify related signal sources or jamming patterns based on the determined phase coherence and the tracked phase relationships over time.

6. The wireless communication device according to claim 2, wherein the processor is further configured to:
- compute correlation matrices for signal segments from each of the first intermediate frequency band and the second intermediate frequency band for the cross-band correlation; and
- merge correlation results using a synchronized timing reference to maintain a real-time or near real-time cross-band correlation.

7. The wireless communication device according to claim 2, wherein the processor is further configured to determine a plurality of null steering parameters based on a combination of spatial characteristics of the jamming signal, a signal-to-interference ratio of the digitized down-converted signals, and a current state of a network performance for application of the spatial nulling to the MIMO antenna array.

8. The wireless communication device according to claim 7, wherein the plurality of null steering parameters comprises two or more of: azimuth and elevation angles of the detected jamming signal, artificial neural network weights for predictive jammer behavior, learning rate parameters for adaptive nulling, environmental context parameters, signal strength distribution parameters, and polarization characteristics of the detected jamming signal.

9. The wireless communication device according to claim 7, wherein the processor is further configured to maintain null positions for the spatial nulling through adaptive tracking of moving interference sources.

10. The wireless communication device according to claim 2, wherein the processor is further configured to:
- execute an artificial neural network model to determine jamming patterns of a plurality of different jamming signals over time based on a result of each cross-band correlation event and each spatial analysis event of the digitized down-converted signals; and
- periodically update a pattern recognition database with the determined jamming patterns of the plurality of different jamming signals.

11. The wireless communication device according to claim 10, wherein the processor is further configured to periodically adjust the jammer defense function based on learned jamming patterns and jamming characteristics from the updated pattern recognition database and the cross-band validation to handle a next jamming signal mitigation event.

12. The wireless communication device according to claim 2, wherein the processor is further configured to:
- perform a correlation of threat signatures of a threat type for the detected jamming signal across the first intermediate frequency band and the second intermediate frequency band; and
- associate a specific jammer defense action that causes the mitigation success of the jamming signal with the threat type.

13. The wireless communication device according to claim 2, wherein the processor is further configured to detect synchronous jammer signal patterns between the first intermediate frequency band and the second intermediate frequency band based on the cross-band correlation and the determined signal characteristics of the digitized down-converted signals.

14. The wireless communication device according to claim 13, wherein the processor is further configured to determine coordinated jamming activities when the detected synchronous jammer signal patterns occur within a predetermined time window.

15. The wireless communication device according to claim 2, wherein for the cross-band validation, the processor is further configured to measure post-mitigation interference levels in each of the first intermediate frequency band and the second intermediate frequency band based on a re-processing of the digitized down-converted signals across the first intermediate frequency band and the second intermediate frequency band.

16. The wireless communication device according to claim 15, wherein the re-processing of the digitized down-converted signals across the first intermediate frequency band and the second intermediate frequency band is based on configuration of multi-link operation (MLO) parameters in the wireless communication device.

17. The wireless communication device according to claim 2, wherein for the cross-band validation, the processor is further configured to compare signal quality metrics before and after the cross-band validation when the mitigation success of the jamming signal is confirmed.

18. The wireless communication device according to claim 17, wherein for the cross-band validation, the processor is further configured to detect residual jamming patterns of the jamming signal across the first intermediate frequency band and the second intermediate frequency band.

19. A method for a real-time or near real-time jamming signals mitigation, the method comprising:

in a wireless communication device:

receiving radio frequency (RF) signals in vertical and horizontal polarizations across a plurality of frequency bands;

applying band-specific filtering operation to the received RF signals to isolate signals-of-interest;

down-converting and digitizing the signals-of-interest to predefined intermediate frequencies to obtain digitized down-converted signals; and determining signal characteristics of the digitized down-converted signals across a first intermediate frequency band and a second intermediate frequency band based on spatial analysis on the digitized down-converted signals, wherein the signal characteristics comprise temporal signal properties, spatial properties from multiple-input-multiple-output (MIMO) antenna inputs, and polarization properties corresponding to vertical and horizontal components.

20. A computer program product for a real-time or near real-time jamming signals mitigation, the computer program product comprising a non-transitory computer-readable storage medium having program instructions embodied therewith, the program instructions being executable by a system to cause the system to execute operations, the operations comprising:

receiving radio frequency (RF) signals in vertical and horizontal polarizations across a plurality of frequency bands;

applying band-specific filtering operation to the received RF signals to isolate signals-of-interest;

down-converting and digitizing the signals-of-interest to predefined intermediate frequencies to obtain digitized down-converted signals; and determining signal characteristics of the digitized down-converted signals across a first intermediate frequency band and a second intermediate frequency band based on spatial analysis on the digitized down-converted signals, wherein the signal characteristics comprise temporal signal properties, spatial properties from multiple-input-multiple-output (MIMO) inputs, and polarization properties corresponding to vertical and horizontal components.

* * * * *